US 9,015,745 B2

(12) United States Patent
Sinha et al.

(10) Patent No.: US 9,015,745 B2
(45) Date of Patent: *Apr. 21, 2015

(54) METHOD AND SYSTEM FOR DETECTION OF USER-INITIATED EVENTS UTILIZING AUTOMATIC CONTENT RECOGNITION

(71) Applicant: Turner Broadcasting System, Inc., Atlanta, GA (US)

(72) Inventors: Nishith Kumar Sinha, Mableton, GA (US); Donald Jude Loheide, Mableton, GA (US); Matthew Paul Giles, Marietta, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/730,734

(22) Filed: Dec. 28, 2012

(65) Prior Publication Data

US 2013/0205326 A1    Aug. 8, 2013

Related U.S. Application Data

(60) Provisional application No. 61/596,012, filed on Feb. 7, 2012.

(51) Int. Cl.
*H04N 7/16*  (2011.01)
*H04N 21/44*  (2011.01)
(Continued)

(52) U.S. Cl.
CPC ........ *H04N 21/44008* (2013.01); *G06T 1/0021* (2013.01); *G06F 17/30495* (2013.01);
(Continued)

(58) Field of Classification Search
CPC ............ H04N 21/8352; H04N 21/835; H04N 21/278; H04N 21/2541
USPC ...................................................... 725/23, 19
See application file for complete search history.

(56) References Cited

U.S. PATENT DOCUMENTS 5,410,326 A    4/1995  Goldstein
5,437,050 A    7/1995  Lamb et al.
(Continued)

FOREIGN PATENT DOCUMENTS

EP    1485815    10/2007
EP    1354276    12/2007
(Continued)

OTHER PUBLICATIONS

Blackburn, Steven G., "Content Based Retrieval and Navigation of Music," University of Southampton Faculty of Engineering and Applied Science, Department of Electronics and Computer Science, Mar. 10, 1999.

(Continued)

*Primary Examiner* — Benjamin R Bruckart
*Assistant Examiner* — Michael M Nguyen
(74) *Attorney, Agent, or Firm* — Arent Fox LLP

(57) ABSTRACT

Systems, methods and/or techniques for detection of user-initiated events in relation to a media device are described, for example utilizing a content recognition system. A method may be executed in a media device that is operable to play video content. The method may include receiving user interaction with the media device and the user interaction causes initiation of a feature that affects video content that plays on the media device. The method may include receiving one or more interactive events from a content recognition system in response to the user interaction. The method may comprise executing the one or more interactive events to affect video content that is playing on the media device, and display one or more overlay windows corresponding to the affected video content. One or more video fingerprints that correspond to the affected video content may be communicated to the content recognition system.

21 Claims, 11 Drawing Sheets

(51) Int. Cl.

| | | |
|---|---|---|
| *G06T 1/00* | (2006.01) | |
| *G06F 17/30* | (2006.01) | |
| *G06F 3/0484* | (2013.01) | |
| *H04N 21/442* | (2011.01) | |
| *H04N 21/4784* | (2011.01) | |
| *H04N 21/4722* | (2011.01) | |
| *H04N 21/478* | (2011.01) | |
| *H04N 21/441* | (2011.01) | |
| *H04N 21/81* | (2011.01) | |
| *H04N 21/435* | (2011.01) | |
| *H04N 21/00* | (2011.01) | |

(52) U.S. Cl.
CPC ............ *G06F3/0484* (2013.01); *H04N 21/442* (2013.01); *H04N 21/4784* (2013.01); *H04N 21/4722* (2013.01); *H04N 21/478* (2013.01); *H04N 21/441* (2013.01); *H04N 21/812* (2013.01); *H04N 21/435* (2013.01); *H04N 21/00* (2013.01)

(56) References Cited

U.S. PATENT DOCUMENTS

| | | | |
|---|---|---|---|
| 5,874,686 | A | 2/1999 | Ghias et al. |
| 5,918,223 | A | 6/1999 | Blum et al. |
| 5,956,683 | A | 9/1999 | Jacobs et al. |
| 5,991,737 | A | 11/1999 | Chen |
| 6,121,530 | A | 9/2000 | Sonoda |
| 6,184,877 | B1 | 2/2001 | Dodson et al. |
| 6,201,176 | B1 | 3/2001 | Yourlo |
| 6,314,577 | B1 | 11/2001 | Pocock |
| 6,408,272 | B1 | 6/2002 | White et al. |
| 6,504,089 | B1 | 1/2003 | Negishi et al. |
| 6,556,218 | B1 | 4/2003 | Alcorn |
| 6,760,720 | B1 | 7/2004 | De Bellis |
| 6,765,595 | B2 | 7/2004 | Lee et al. |
| 6,834,308 | B1 | 12/2004 | Ikezoye et al. |
| 6,968,337 | B2 | 11/2005 | Wold |
| 6,990,453 | B2 | 1/2006 | Wang et al. |
| 7,080,325 | B2 | 7/2006 | Treibach-Heck et al. |
| 7,134,132 | B1 | 11/2006 | Ngo |
| 7,174,293 | B2 | 2/2007 | Kenyon et al. |
| 7,190,971 | B1 | 3/2007 | Kawamoto |
| 7,194,752 | B1 | 3/2007 | Kenyon et al. |
| 7,266,343 | B1 | 9/2007 | Yli-juuti et al. |
| 7,363,278 | B2 | 4/2008 | Schmelzer et al. |
| 7,444,353 | B1 | 10/2008 | Chen et al. |
| 7,500,007 | B2 | 3/2009 | Ikezoye et al. |
| 7,529,659 | B2 | 5/2009 | Wold |
| 7,562,012 | B2 | 7/2009 | Wold et al. |
| 7,562,392 | B1 | 7/2009 | Rhoads et al. |
| 7,565,327 | B2 | 7/2009 | Schmelzer |
| 7,624,416 | B1 | 11/2009 | Vandermolen |
| 7,707,088 | B2 | 4/2010 | Schmelzer |
| 7,711,652 | B2 | 5/2010 | Schmelzer |
| 7,783,489 | B2 | 8/2010 | Kenyon et al. |
| 7,797,249 | B2 | 9/2010 | Schmelzer et al. |
| 7,813,954 | B1 | 10/2010 | Price |
| 7,870,574 | B2 | 1/2011 | Kenyon et al. |
| 7,877,438 | B2 | 1/2011 | Schrempp et al. |
| 7,917,645 | B2 | 3/2011 | Ikezoye et al. |
| 8,249,422 | B2 | 8/2012 | Narahara et al. |
| 8,335,833 | B1 | 12/2012 | Parkinson |
| 8,407,750 | B2 | 3/2013 | Vorbau |
| 8,418,206 | B2 | 4/2013 | Bryant et al. |
| 2002/0069100 | A1 | 6/2002 | Arberman |
| 2002/0073419 | A1 | 6/2002 | Yen |
| 2002/0078441 | A1 | 6/2002 | Drake |
| 2002/0083060 | A1 | 6/2002 | Wang et al. |
| 2002/0120925 | A1 | 8/2002 | Logan |
| 2002/0178447 | A1 | 11/2002 | Plotnick |
| 2003/0035075 | A1 | 2/2003 | Butler et al. |
| 2003/0055699 | A1 | 3/2003 | O'Connor |
| 2003/0101451 | A1 | 5/2003 | Bentolila |
| 2003/0149975 | A1 | 8/2003 | Eldering |
| 2003/0154475 | A1 | 8/2003 | Rodriguez et al. |
| 2003/0172381 | A1 | 9/2003 | Janevski |
| 2004/0034874 | A1* | 2/2004 | Hord et al. ..................... 725/136 |
| 2004/0143349 | A1* | 7/2004 | Roberts et al. .................. 700/94 |
| 2005/0235307 | A1 | 10/2005 | Relan |
| 2005/0278731 | A1 | 12/2005 | Cameron |
| 2006/0015923 | A1 | 1/2006 | Chuah |
| 2006/0026636 | A1 | 2/2006 | Stark et al. |
| 2006/0031684 | A1* | 2/2006 | Sharma et al. ................ 713/186 |
| 2006/0187358 | A1 | 8/2006 | Lienhart |
| 2006/0195860 | A1 | 8/2006 | Eldering |
| 2007/0192784 | A1* | 8/2007 | Postrel ............................ 725/23 |
| 2007/0250901 | A1 | 10/2007 | McIntire |
| 2008/0104634 | A1 | 5/2008 | Gajdos et al. |
| 2008/0310731 | A1 | 12/2008 | Stojancic et al. |
| 2008/0313140 | A1 | 12/2008 | Pereira et al. |
| 2009/0064261 | A1 | 3/2009 | Jung |
| 2009/0119723 | A1* | 5/2009 | Tinsman ......................... 725/87 |
| 2009/0133049 | A1 | 5/2009 | Bradley ......................... 725/28 |
| 2009/0317053 | A1* | 12/2009 | Morley et al. ................... 386/68 |
| 2010/0007797 | A1 | 1/2010 | Stojancic |
| 2010/0043040 | A1 | 2/2010 | Olsen |
| 2010/0121691 | A1 | 5/2010 | Shifflett et al. |
| 2010/0158391 | A1* | 6/2010 | Cunningham et al. ........ 382/209 |
| 2010/0169906 | A1 | 7/2010 | Takahashi |
| 2010/0175078 | A1 | 7/2010 | Knudson |
| 2010/0303338 | A1 | 12/2010 | Stojancic et al. |
| 2010/0306193 | A1 | 12/2010 | Pereira et al. |
| 2010/0318515 | A1 | 12/2010 | Ramanathan et al. |
| 2011/0067066 | A1 | 3/2011 | Barton |
| 2011/0078729 | A1 | 3/2011 | Lajoie et al. |
| 2011/0088063 | A1 | 4/2011 | Ben-Romdhane et al. |
| 2011/0122255 | A1 | 5/2011 | Haritaoglu |
| 2011/0191806 | A1 | 8/2011 | Knudson et al. |
| 2011/0283322 | A1 | 11/2011 | Hamano |
| 2011/0289114 | A1 | 11/2011 | Yu et al. |
| 2011/0289524 | A1 | 11/2011 | Toner |
| 2011/0311095 | A1 | 12/2011 | Archer |
| 2011/0314495 | A1 | 12/2011 | Zenor |
| 2012/0042334 | A1 | 2/2012 | Choi |
| 2012/0124625 | A1 | 5/2012 | Foote |
| 2012/0167133 | A1 | 6/2012 | Carroll |
| 2012/0174157 | A1 | 7/2012 | Stinson |
| 2012/0192227 | A1 | 7/2012 | Fleischman |
| 2012/0215789 | A1 | 8/2012 | Ramanathan |
| 2012/0246693 | A1 | 9/2012 | Iqbal |
| 2012/0311618 | A1 | 12/2012 | Blaxland |
| 2012/0317240 | A1 | 12/2012 | Wang |
| 2012/0331496 | A1 | 12/2012 | Copertino |
| 2013/0019262 | A1 | 1/2013 | Bhatia et al. |
| 2013/0047178 | A1 | 2/2013 | Moon |
| 2013/0132999 | A1 | 5/2013 | Pandey |
| 2013/0162902 | A1 | 6/2013 | Musser |
| 2013/0163957 | A1 | 6/2013 | Ikizyan |
| 2013/0208942 | A1 | 8/2013 | Davis |
| 2013/0332951 | A1 | 12/2013 | Gharaat |

FOREIGN PATENT DOCUMENTS

| | | |
|---|---|---|
| JP | 11055201 | 2/1999 |
| WO | WO9517746 | 6/1995 |

OTHER PUBLICATIONS

Blackburn, Steven G., "Search by Humming," University of Southampton Faculty of Engineering, Department of Electronics and Computer Science, May 8, 1997.

Ghias, Asif et al., "Query by Humming—Musical Information Retrieval in an Audio Database," ACM Multimedia 95—Electronic Proceedings, Nov. 5-9, 1995, San Francisco, CA.

ProQuest, PR Newswire, New York, "Mobile Music: Comcast Cellular First in U.S. to Trial Breakthrough Interactive Music Service Call *CD," Feb. 11, 1999, p. 1.

Taylor, Chuck, "Company Lets Listeners Dial for CDs StarCD Turns Cell Phones Into Radio-Music Storefronts," Billboard: Jun. 26, 1999; 111, 26; General Interest Module, p. 86.

(56) References Cited

OTHER PUBLICATIONS

Tseng, Yuen-Hsien, "Content-Based Retrieval for Music Collections," SIGIR99 22nd Annual International ACM SIGIR Conference on Research and Development in Information Retrieval, Berkeley, CA, Aug. 15-19, 1999.

Whittle, Robin, "Future Developments in the Music Market," Contemporary Music Summit in Canberra Apr. 27, 1995, Apr. 11, 1995.

* cited by examiner

METHOD AND SYSTEM FOR DETECTION OF USER-INITIATED EVENTS UTILIZING AUTOMATIC CONTENT RECOGNITION

CROSS-REFERENCE TO RELATED APPLICATIONS

This application makes reference to, claims priority to, and claims the benefit of U.S. provisional application 61/596,012, filed on Feb. 7, 2012.

This application also makes reference to:
U.S. patent application Ser. No. 13/730,359, filed Dec. 28, 2012;
U.S. patent application Ser. No. 13/730,422, filed Dec. 28, 2012;
U.S. patent application Ser. No. 13/730,459, filed Dec. 28, 2012;
U.S. patent application Ser. No. 13/730,495, filed Dec. 28, 2012;
U.S. patent application Ser. No. 13/730,530, filed Dec. 28, 2012;
U.S. patent application Ser. No. 13/730,754, filed Dec. 28, 2012;
U.S. patent application Ser. No. 13/730,559, filed Dec. 28, 2012;
U.S. patent application Ser. No. 13/730,579, filed Dec. 28, 2012;
U.S. patent application Ser. No. 13/730,593, filed Dec. 28, 2012;
U.S. patent application Ser. No. 13/730,759, filed Dec. 28, 2012;
U.S. patent application Ser. No. 13/730,627, filed Dec. 28, 2012;
U.S. patent application Ser. No. 13/730,644, filed Dec. 28, 2012;
U.S. patent application Ser. No. 13/730,656, filed Dec. 28, 2012;
U.S. patent application Ser. No. 13/730,670, filed Dec. 28, 2012;
U.S. patent application Ser. No. 13/730,691, filed Dec. 28, 2012;
U.S. patent application Ser. No. 13/730,702, filed Dec. 28, 2012; and
U.S. patent application Ser. No. 13/730,718, filed Dec. 28, 2012.

Each of the above referenced applications is hereby incorporated herein by reference in its entirety.

FIELD OF THE INVENTION

Certain embodiments of the invention relate to digital audio/video content recognition. More specifically, certain embodiments of the invention relate to a method and system for detection of user-initiated events utilizing automatic content recognition.

BACKGROUND OF THE INVENTION

Smart or connected televisions (TVs) may receive data from data networks that allow a viewer to access broadcast digital content and also receive multimedia content. Smart TVs may also be capable of receiving and communicating information over the internet.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for detection of user-initiated events utilizing automatic content recognition, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
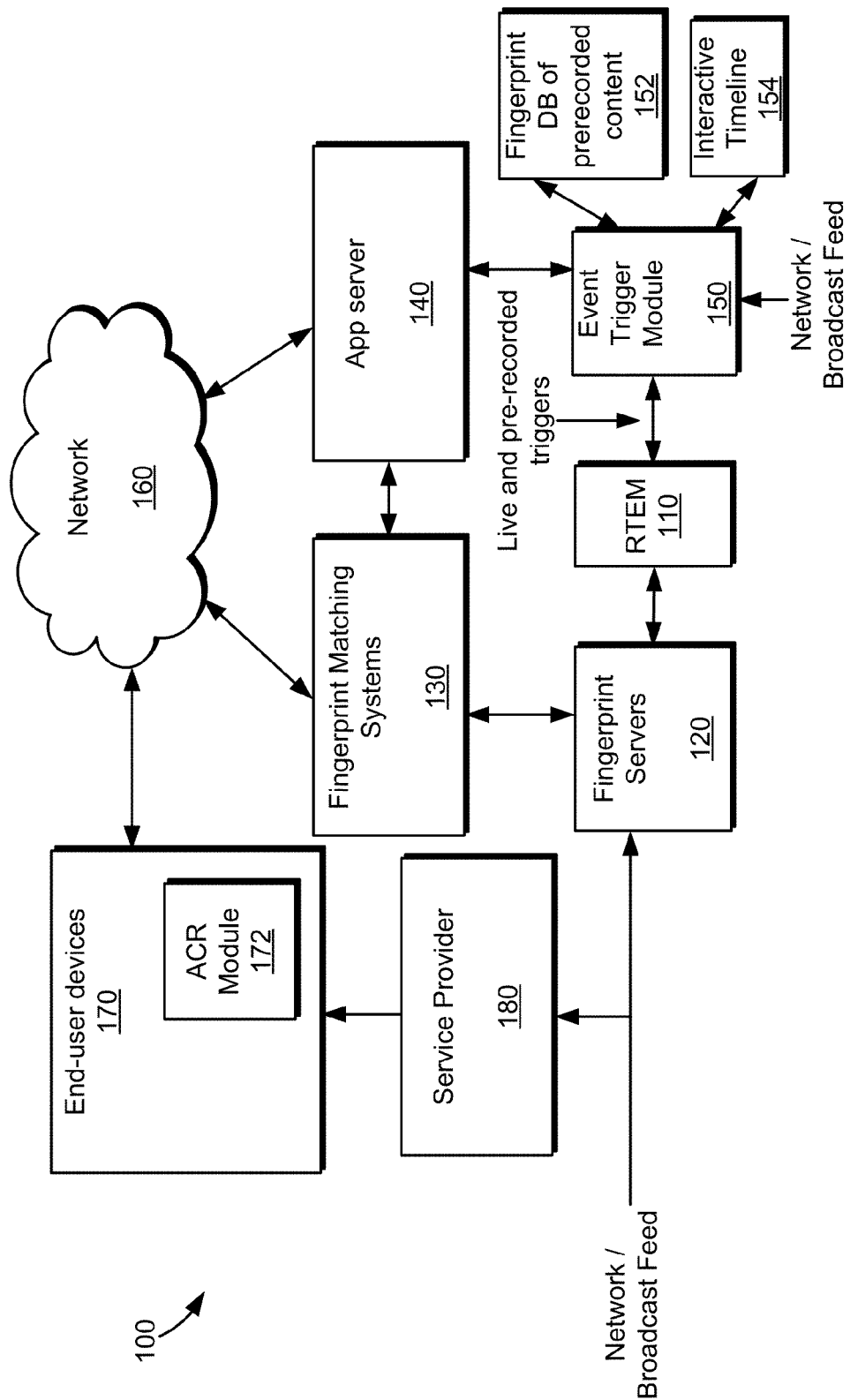
FIG. 1 is a high-level block diagram illustrating an exemplary system for detection of user-initiated events, in accordance with one or more embodiments of the present invention.

Certain embodiments of the present disclosure may be found in a method and system for detection of user-initiated events utilizing automatic content recognition (ACR). Various embodiments of the present invention may enable the detection of user-initiated events utilizing a system that is operable to perform automatic content recognition and that may utilize an abstraction layer. Various embodiments of the invention may utilize ACR techniques described herein to detect user interaction with a media device and/or a unit (for example, a set-top box) associated with (or included within) the media device. In response to detecting certain user interactions, the content recognition system may cause an interactive event to be communicated to and be executed on the media device. A viewer may interact with the interactive event, which may affect the operation of the media device and/or the unit, for example, a set-top box.

In various embodiments of the invention, a method may be executed in a media device that is operable to play video content. The method may comprise receiving user interaction with the media device, wherein the user interaction causes the initiation of a feature that affects video content that plays on the media device. One or more interactive events may be received from a content recognition system in response to the user interaction. The one or more interactive events may be executed in order to affect video content that is playing on the media device, and one or more overlay windows may be displayed. The method may comprise communicating to the content recognition system one or more video fingerprints that correspond to video content that has been affected by the user interaction. The content recognition system may communicate the one or more interactive events to the media device in response to detecting a match with the one or more video fingerprints. The one or more interactive events may be executed at a time that is synchronized to the user interaction with the media device.

In an exemplary embodiment of the invention, the video content as affected by the user interaction may determine the one or more interactive events that are communicated from the content recognition system. For example, the user interaction may cause the initiation of a feature that is operable to fast forward through one or more commercials. The one or more interactive events, when executed, may display an incentive to watch the one or more commercials and may display an option whether to continue fast forwarding. The incentive to watch the one or more commercials may be an overlay window that informs viewers of a scavenger hunt game, and the scavenger hunt game may be operable to allow viewers to earn points by indicating items in the one or more commercials. In another example, the user interaction may cause the initiation of a feature that is operable to pause a program, and the one or more interactive events, when executed, may display entertainment or advertisements while the video content is paused. In another example, the user interaction may cause the initiation of a feature that is operable to tune to an unauthorized or blocked channel or program, and the one or more interactive events, when executed, may block the media device from displaying an unauthorized program and may tune to an alternative channel.

In an exemplary embodiment of the invention, the method may comprise executing the one or more interactive events to accept user response data from a user. The user response data affects video content that plays on the media device. In another exemplary embodiment, user preferences may determine the type of the one or more interactive events that are communicated from the content recognition system.

Various embodiments of the invention may utilize a content recognition system comprising one or more servers. The content recognition system may be operable to detect one or more matches between one or more video fingerprints corresponding to video content playing on a media device and one or more video fingerprints corresponding to video content, for example, archived content, in the content recognition system. The content recognition system may be operable to detect user interaction with the media device by analyzing the one or more fingerprint matches. The user interaction may initiate a feature that affects video content that plays on the media device. In response to the user interaction, the one or more servers of the content recognition system may be operable to communicate one or more interactive events to the media device. The one or more interactive events may be operable to execute on the media device and may be operable to control video content that plays on the media device. In some embodiments of the invention, the content recognition system comprises an event trigger module that is operable to indicate to the one or more servers the one or more interactive events that should be communicated to the media device.

In some embodiments of the invention, the content recognition system comprises an event trigger module that is operable to indicate to the one or more servers, one or more types of video playback situations related to video content playing on the media device that should trigger an interactive event. The types of video playback situations may comprise one or more of the following: when the video content starts, stops, pauses, fast forwards, reverses and changes playback speed, etc. In some embodiments of the invention, the one or more interactive events may be adapted to present an incentive to watch a commercial if a viewer initiates a feature that is operable to fast forward the video content. In some embodiments, the one or more interactive events may be adapted to entertain a viewer or present advertisements while the video content is paused.

In some embodiments of the invention, the content recognition system may be operable to implement parental controls by detecting user interaction with the media device by detecting the initiation of a feature that is operable to tune to an unauthorized channel or program. In this regard, the one or more interactive events may be adapted to block the media device from displaying an unauthorized program, and may tune to an alternative channel.

FIG. 1 is a high-level block diagram illustrating an exemplary system for detection of user-initiated events, in accordance with one or more embodiments of the present invention. Referring to FIG. 1, there is shown an ACR system with abstraction layer. The system 100 may comprise an real-time event manager 110, one or more fingerprint servers 120, one or more fingerprint matching systems 130, an application server 140, an event trigger module 150, a network 160, and one or more end-user devices 170. A live network/broadcast feed (shown in FIG. 1) may be provided to the system 100, and the same, time delayed, broadcast feed may be read/analyzed by end-user devices 170 (media devices) connected to system 100 and by fingerprint servers 120 (and for example other modules) included in system 100. Each of the end-user devices 170 may comprise an ACR module 172. FIG. 1 also shows a service provider 180 that provides service to the end-user devices 170. FIG. 1 also shows a fingerprint database (DB) of pre-recorded content 152 and an interactive timeline module 154.

The real-time event manager 110 may comprise suitable logic, circuitry, code, and/or interfaces that may be operable to manage real-time events based on inputs provided by one or more sources. For example, the real-time event manager 110 may be operable to manage real-time events provided by an event trigger module 150 that may assign interactive event IDs to live network programming. The real-time event manager 110 may also manage interactive events (interactive event IDs assigned to archived network programming) provided by an event trigger module 150, which may be prepared by a component that analyzes and archives video segments. A network time protocol (NTP) server may be utilized to provide synchronization of multiple fingerprint servers utilizing multiple fingerprint technologies. Moreover, the real-time event manager 110 may be operable to trigger interactive events in legacy systems and/or in web-based systems.

The real-time event manager 110 may be operable to receive one or more inputs from an event trigger module 150 and generate, based on those inputs, the interactive event identifiers (IDs) that can be communicated to the fingerprint servers where they can be associated with or assigned to the video fingerprints generated by the fingerprint servers 120. The real-time event manager 110 may be operable to communicate the interactive event IDs to a television system (e.g., legacy system) and/or to a web system. The interactive event identifiers may be utilized in the television system and/or in the web system to trigger interactive events. Moreover, the communication of the interactive event identifiers may be based on one or more of an EBIF, an HTTP live streaming (HLS), a satellite network protocol, or some other protocol.

In an embodiment of the invention, the real-time event manager 110 may be operable to generate one or more signals that provide instructions to the fingerprint servers 120 to enable the identification of a network television station based on the logo, symbol, sign, watermark, and/or text that are typically utilized to represent the network television station. The instructions may be related to information that is to be generated and/or provided to the end-user devices 170 for network television station identification. The instructions may indicate the type of information that is to be provided to the end-user devices 170 and/or when such information is to be provided. In some instances, a portion of the ACR system 100 other than the real-time event manager 110, or in conjunction with the real-time event manager 110, may generate the signals for providing instructions to the fingerprint servers 120.

The fingerprint servers 120 may comprise suitable logic, circuitry, code, and/or interfaces that may be operable to handle fingerprinting and fingerprint communications to the fingerprint matching systems 130. Since each vendor or television manufacturer is likely to utilize its own fingerprint technology, each of the fingerprint servers 120 may be a dedicated server for each of the fingerprint technologies supported by the system 100. In some embodiments of the invention, a portion of one or more fingerprint servers 120 may be operable to perform video fingerprinting while a portion may be operable to perform audio fingerprinting. Fingerprint technologies from multiple vendors may utilize different computations to perform fingerprinting of video and/or audio frames. For example, each fingerprint technology may utilize a specific set of algorithms, parameters, operations, and/or data processing methods, for example.

In an embodiment of the invention, the fingerprint servers 120 may be operable to receive one or more signals from the real-time event manager 110 and/or from another portion of the ACR system 100 to enable the identification of a network television station based on the logo, symbol, sign, watermark, and/or text that are typically utilized to represent the network television station. U.S. application Ser. No. 13/730,422, discloses an exemplary method and system for logo identification utilizing ACR in accordance with an embodiment of the invention. The instructions may be utilized to determine and/or provide locations to the end-user devices 170 to take fingerprints of the video content being displayed on a viewing screen. In some instances, at least a portion of the fingerprinting locations may be provided by the real-time event manager 110 and/or by another portion of the ACR system 100 through the instructions received by the fingerprint servers 120. In other instances, the fingerprinting locations may be determined by the fingerprint servers 120 based on locally and/or remotely stored information. Each fingerprinting location may comprise coordinates in a video frame (e.g., x coordinates, y coordinates) that indicate a particular region in the video frame to fingerprint.

The fingerprint servers 120 may provide the fingerprinting locations for communication to the end-user devices 170, for example, in the form of fingerprint profiles. The fingerprint profiles may comprise fingerprinting locations and/or other information to be utilized by an end-user device for ACR fingerprinting. In some instances, the fingerprint profiles may be generated by the fingerprint servers 120 in response to the instructions received. In other instances, the fingerprint profiles comprising the fingerprinting locations may be received by the fingerprint servers from the real-time event manager 110 and/or from another portion of the ACR system 100. The fingerprint profile of a particular end-user device 170 may be updated based on an indication that additional and/or different locations may be needed during fingerprinting to identify the network television station logo or symbol being displayed on a viewing screen at the end-user device 170. The update may be generated by the corresponding fingerprint server and then communicated to the end-user device 170 or may be received by the corresponding RTFS from the real-time event manager 110 and/or from another portion of the ACR system 100 and then communicated to the end-user device 170.

The indication that a fingerprint profile update may be needed may be the result of network operations that recognize that certain content is being broadcast by several network television stations concurrently (e.g., State of the Union address). In such instances, the fingerprinting locations being utilized may not analyze the region in a video frame where the logo of the network television station is displayed. Thus, providing additional fingerprinting locations in this region may enable detection and identification of the logo and, consequently, of the network television station.

The indication that a fingerprint profile update may be needed may also be the result of feedback provided by an end-user device 170. The feedback may indicate, for example, that the content being displayed has been identified but that the content may have originated in any one of several sources and the particular source of the content has not been identified. In such instances, the fingerprinting locations being utilized may not analyze the region in a video frame where the logo of the network television station is displayed. Thus, providing additional fingerprinting locations in this region may enable detection and identification of the logo and, consequently, of the source of the content.

In some instances, the fingerprint profile and/or the fingerprint profile update received by an end-user device may comprise information that indicates to the end-user device that any additional fingerprinting locations may be utilized automatically when the source (e.g., network television station) of a particular content is not initially identified.

In one or more embodiments of the invention, the fingerprint servers 120 may be operable to communicate fingerprint profiles and/or fingerprint profile updates to the end-user devices 170 through the fingerprint matching systems 130. Feedback and/or queries from the end-user devices 170 may be received by the fingerprint servers 120 for processing. The fingerprint servers 120 may in turn communicate information corresponding to the feedback and/or queries from the end-user devices 170 to the real-time event manager 110 and/or to another portion of the ACR system 100 for further processing.

The fingerprint matching systems 130 may comprise suitable logic, circuitry, code, and/or interfaces that may be operable for matching fingerprints produced by the fingerprint servers 120 with fingerprints produced by the end-user devices 170. Each of the fingerprint matching systems 130 may correspond to a particular ACR or fingerprint technology. In this regard, each of the fingerprint matching systems 130 may be supported by a third party such as a TV manufacturer, for example. Additionally, one or more of the fingerprint matching systems 130 may be a hosted service, for example, cloud computing, etc., which may be accessible via the Internet.

The fingerprint servers 120 may be operable to send fingerprints, interactive event IDs and other information to their corresponding fingerprint vendors (fingerprint matching systems 130) through one or more networks (e.g., wireline networks, optical, hybrid fiber coaxial (HFC), wireless networks) and/or by utilizing one or more communication protocols. Communication between the fingerprint servers 120 and the fingerprint matching systems 130 may occur through one or more wireless and/or wireline communication links. The communication links described above may support one or more communication protocols. Accordingly, the fingerprint servers 120 and the fingerprint matching systems 130 may comprise suitable logic, circuitry, code, and/or interfaces to enable the use of the appropriate communication protocols.

The fingerprint matching systems 130 may be operable to compare fingerprints produced by the end-user devices 170 with fingerprints provided by the fingerprint servers. When a match occurs, a fingerprint matching system 130 may indicate that an interactive event is to take place in an end-user device 170. These interactive events may allow a viewer of an end-user device 170 to be presented with information on the screen or display of an end-user device (such as advertisements, prompts to change channels or playback modes, notifications of coupons, games and the like) and may allow a viewer to interact with the information presented.

Communications between the fingerprint matching systems 130 and the end-user devices 170 may occur through one or more communication links/networks (e.g., wireline networks, optical, hybrid fiber coaxial (HFC), wireless networks), for example network 160, and/or by utilizing one or more communication protocols. The communication links and/or networks described above may support one or more communication protocols. Accordingly, the fingerprint matching systems 130 and the end-user devices 170 may comprise suitable logic, circuitry, code, and/or interfaces to enable the use of the appropriate communication protocols.

The application server 140 may comprise suitable logic, circuitry, code, and/or interfaces that may be operable to store or host (or contain address information related to the location of) one or more applications or interactive events. It should be understood that a system (for example, system 100) may include more than one application server, even though some of the figures and descriptions throughout this disclosure may refer to a single application server in order to describe certain aspects of the systems and methods of this disclosure. It should be understood that in some setups, an end-user device may have an application installed prior to the time that a fingerprint match is detected related to that device. In this setup, the application server may push an interactive event that displays and/or executes on the pre-installed application. In other setups and/or situations, the application itself may be pushed to the end-user device and the end-user device may be operable to handle and/or execute the application and interactive event. Various configurations may exist with respect to the end-user devices and the application server such that portions of the code, which may be operable to execute an interactive event on an end-user device may be pre-installed on the end-user device. Therefore, throughout this disclosure, when reference is made to an application or an interactive event being pushed or communicated from an application server, it may be understood that the application, or one or more portions thereof, may be pre-installed on the end-user device. Alternatively, the application server may push the application including the interactive event together.

The application server 140 may be operable to receive from an end-user device 170 information related to an interactive event ID. The information may be provided by the end-user device 170 in response to a match between a fingerprint that may be taken and/or generated by the end-user device and a fingerprint that may be taken and/or generated by a corresponding fingerprint server 120. In some embodiments of the present disclosure, the application server 140 may receive information related to an interactive event ID directly from a fingerprint matching system 130 instead of or in addition to receiving information from an end-user device 170. Thus, in this regard, the end-user device may prompt the application server 140 for content, or the application server 140 may push the content to the end-user device without being prompted by the end-user device. Therefore, throughout this disclosure, whenever reference is made to the end-user device requesting content from an application server (i.e., a pull), the application server may actually push the content to the end-user device, and vice versa with respect to references to application servers pushing content (i.e., the end-user device may instead request content from the application servers).

The event trigger module 150 may comprise servers, computers, devices, user interfaces and the like that allow interaction between an administrative user (such as a partner or an event creator, director, etc.) and the system 100. Alternative, or in conjunction, the event trigger module 150 may allow for interaction with a component that archives and analyzes video segments. In one example, the event trigger module 150 may include an end-user computer and peripheral devices and/or interfaces such that an individual (such as a partner or an event creator, director, etc.) may communicate with the system 100 via the computer and peripherals and/or interfaces. The event trigger module 150 may include peripherals and/or interfaces whereby a partner that is responsible for creating event content that appears on end-user devices may create interactive events that synchronize to a live or replayed broadcast. In another embodiment of the invention, the event trigger module may include (or be in communication with) a component that archives and analyzes video segments such that interactive events may be assigned to archived video segments. For example, a component may analyze and store an episode of a TV show and may determine when in the episode (or related commercial) an interactive event is to take place (for example, when to push a commercial to a media device). The event trigger module 150 may then communicate with an interactive timeline archive to associate event IDs, which can then be communicated to a real-time event manager 110 to assign those interactive event IDs to fingerprints associated with live or replayed programming.

In operation, once the event trigger module 150 communicates with the real-time event manager 110 to assign interactive event IDs to fingerprints associated with live or replayed programming being viewed on an end-user device 170, the real-time event manager 110 may generate and/or handle event identifiers or event triggers that correspond to specific times in a program. The event identifiers may be assigned to the appropriate fingerprints generated by the fingerprint servers 120. The real-time event manager 110 may provide synchronization to appropriately assign the event identifiers to the right spot on a video and/or audio sequence.

Each of the fingerprint servers 120 may then communicate the event identifiers (generated or handled by real-time event manager 110) and the fingerprints to its corresponding one of the fingerprint matching systems 130. The fingerprint matching systems 130 in turn receive fingerprints from their corresponding end-user devices 170 and try to match those fingerprints to the ones received from their corresponding fingerprint servers 120. When a match occurs, the event identifier and/or other information may be passed to the appropriate end-user device (and/or to an application server 140). Based on information determined by the fingerprint matching system 130, the end-user device may obtain, for example, interactive information (e.g., graphics, text, applications) from the application server 140. There may be other actions performed by the user in connection with the interactive event and/or other information presented or produced in connection with the interactive event.

Once a match occurs in one of the fingerprint matching systems 130 and the end-user device 170 (and/or the application server 140) obtains the appropriate information from its corresponding fingerprint vendor, the application server 140 then sends the appropriate content (such as an application or interactive event) to the end-user device that corresponds to the interactive event ID. The end-user device may communicate interactive event ID information to the application server 140 in order to request content or content may be pushed by the application server 140 to an end-user device without the device requesting it. In some embodiments, in order for an end-user device to accept content from an application server 140, the device may have to be logged in to an appropriate network-connected application, web page or the like. Additionally, the end-user device may need to have an appropriate ACR service running on the device.

The end-user devices 170 may comprise a plurality of devices such as connected TVs, connected TV with paired handheld and/or mobile devices (also referred to as second-screen devices) such as smartphones, PDAs and tablets, for example. End-user devices may also be referred to as media devices, where an end-user device may be a media device that is utilized by a user to communicate with a system, such as an ACR system. The End-user devices may also be referred to as viewer devices, display devices, or ACR-based devices, for example. In a particular end-user device setup, for example a setup in a viewer's home, one or more devices may be connected to a system 100. Each device in a setup may be connected to the system via a network 160, or via a separate end-user device that is part of the same setup. For example, a viewer may have a setup that includes a smart TV that connects to the system 100 via the network 160, and the viewer may also have a tablet (or other second-screen device) that communicates with the smart TV and allows the viewer to interact with content that is displayed on the smart TV. In some instances, the content displayed on such a second-screen device may coincide with the content that is displayed on the main end-user device, and this coincided content may allow a user or viewer to interact with content displayed on the main end-user device in a synchronized manner. In instances when a secondary or paired device that supports a particular fingerprint technology is used, that device may also be able to communicate with the corresponding fingerprint match (i.e., as in the case of audio) system 120 that supports the compatible fingerprint technology. This may in effect comprise a manual pairing with presented content on the primary screen (i.e., TV) and as such may operate in a similar manner to pairing directly with the smart TV.

Each of the end-user devices 170 may comprise an ACR module 172. The ACR module 172 may comprise suitable logic, circuitry, interfaces and/or code that may be operable to provide various functionality and/or services comprising synchronous event manager functionality, fingerprint capture services, logo detection, and/or user initiated event detection.

An end-user device 170 may include (or be in communication with) a media unit provided or supported by a television network or service provider, such as, for example, a set-top box, gateway, computer, tuner, other digital video device, etc. The media unit may read and/or analyze a network/broadcast feed (as shown in FIG. 1, for example) in order to display programming on the end-user device 170. The media unit may include a digital video recorder (DVR) component that is operable to record live programming for later replay or playback by a viewer, sometimes referred to as on demand viewing. An ACR system, for example, system 100, may be operable to analyze video being played back on an end-user device via a DVR the same as it analyzes live programming. In this respect, an ACR system may analyze video being played back via a DVR, generate fingerprints of the video, and send the fingerprints to a fingerprint matching system (for example, systems 130). A media unit and a smart TV (end-user device) may also be configured and operate such that the smart TV may communicate commands to the media unit. For example, a smart TV (with proper authentication, for example) may be operable to instruct a media unit to change channels, perform video playback functions, perform guide functions and the like. A media unit may comprise suitable logic, circuitry, code, and/or interfaces, and may utilize appropriate communication protocols to interact directly with a network, for example, the network 160. In this regard, a media unit may send data via a network or may receive commands via a network.

End-user devices, for example utilizing an ACR service, API's, an application framework, and other interface, circuitry, software and the like, may be operable to present applications to a viewer. For example, an end-user device may be operable to present text (including customized formatting, including new lines, pages, fonts and the like), window borders, wrappings and other graphics. Additionally, an end-user device may be operable to present customized overlay windows, for example designed by third parties. An end-user device may be adapted to present brand graphics and messages, sponsorship text and logos, graphs and other feedback images, for example, user response results from a poll.

The end-user devices 170 may be operable to receive and utilize a fingerprint profile and/or a fingerprint profile update and to take fingerprints in a pre-determined number of locations in a video frame. Each fingerprinting location may be defined by a set of coordinates that describe a region in the video frame where a fingerprint of the video content is to be taken. The end-user devices 170 may be operable to receive a series of fingerprint profiles and/or fingerprint profile updates and may be operable to adjust ACR fingerprinting accordingly.

The abstraction layer may refer to, for example, the ability of an ACR system to assign the same event identifiers to different sets of video fingerprints that are generated by different video fingerprint technologies. That is, by appropriately timing the assignment of event identifiers to multiple sequences of video fingerprints that are generated from the same video content but with different video fingerprinting technologies, a single ACR system is able to support video fingerprinting technologies from multiple vendors. This approach allows the ACR system to be both flexible and scalable with respect to fingerprint technology vendors. Additional details of an exemplary ACR system that utilizes an abstraction layer may be found in U.S. patent application Ser. No. 13/730,352, filed on Dec. 28, 2012, which is hereby incorporated herein by reference in its entirety.

Figure 2:
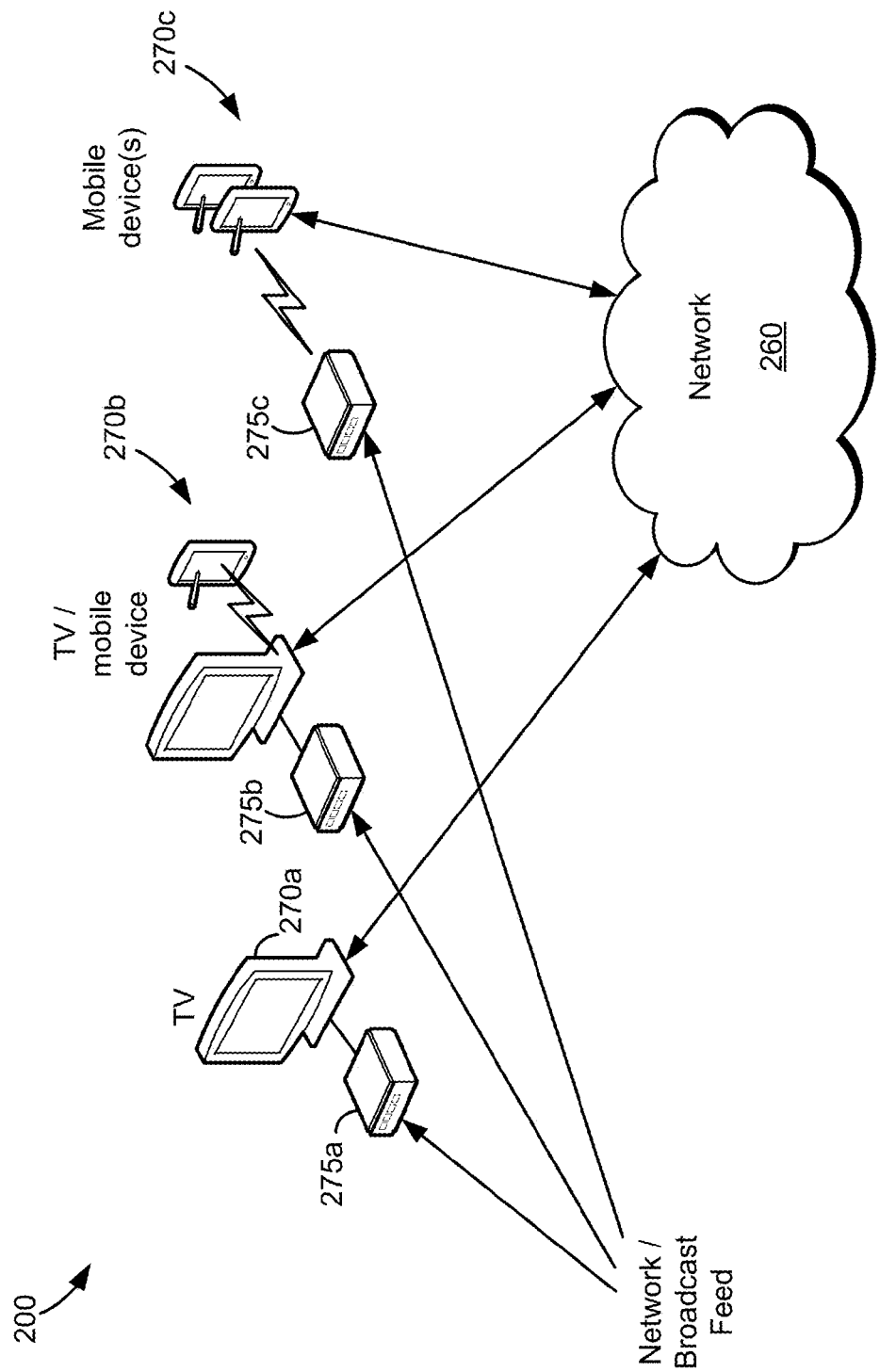
FIG. 2 is a high-level block diagram illustrating a portion of an exemplary system for detection of user-initiated events, in accordance with one or more embodiments of the present invention.

FIG. 2 is a high-level block diagram illustrating a portion of an exemplary system for detection of user-initiated events, in accordance with one or more embodiments of the present invention. Referring to FIG. 2, there is shown a portion 200 of an exemplary system for detection of user-initiated events, which may comprise one or more end-user devices (devices 270a, ..., 270c) and a network 260. The network 260 may be a network similar to the network 160 described in association with FIG. 1. As shown in FIG. 2, various end-user devices (media devices) such as connected (smart) TVs, smart TVs with paired hand-held (second-screen) devices, and even hand-held devices only may be connected via a network 260 to an ACR system (for example, similar to the system 100 of FIG. 1).

In one setup, a single smart TV (device 270a) may be connected to an ACR system. In another setup, multiple devices 270b may be connected to an ACR system, for example where one device, such as a smart TV may be the primary end-user device, and one or more hand-held devices, such as tablets, PDAs or smart phones, may be second-screen devices. A second-screen device associated with the connected TVs may be a tablet (e.g., iPad, Samsung Galaxy, etc.), smartphone (e.g., iPhone, Android, etc.), or other like device, for example. In this setup, the second screen devices may either be in communication with the network 260 directly, or they may be in communication with the network via the primary device, or both. It should be understood that in any particular setup, not all of the devices need to be ACR-enabled devices. In some examples, one of the devices may an ACR-enabled device and the other may not be ACR-capable, but may still interact with the ACR-enabled device. Therefore, throughout this disclosure, whenever reference is made to an ACR-based device in a setup, it should be understood that not all of the devices need to be ACR-capable. Devices in a setup may also be referred to as media devices. Furthermore, throughout this disclosure, whenever reference is made to a single end-user device in a setup, it should be understood that the setup may contain multiple end-user devices, and vice versa with respect to references to multiple end-user devices. In another setup, hand-held devices 270c, which may in some situations operate as second-screen devices, may act as one or more primary end-user devices and optionally one or more secondary end-user devices. In this setup, one or more handheld devices may receive broadcast feed content and may also allow one or more users to interact with interactive events sent over the network 260.

An end-user device (for example, devices 270a, ..., 270c) may include (or be in communication with) a media unit (for example, set-top boxes 275a, ..., 275c). The media unit may have been provided by or be supported by a television network or service provider. The media unit may read and/or analyze a network/broadcast feed (as shown in FIG. 2) in order to display programming on the end-user device. In many respects, the media unit of FIG. 3 may be similar to the media unit described in conjunction with FIG. 1, for example. Viewers may interact with the media unit via an associated remote control, or optionally via a hand-held device. For example, a viewer may interact with the media unit to start, stop, fast forward, reverse and/or pause content that is playing on the end-user device. The viewer may also interact with the media unit to select (or tune in to) a channel to watch, or to change channels. The viewer may also interact with the media unit to view, manage, select and/or watch and/or replay recorded programming, and in this regard, the viewer may interact with the media unit to start, stop, fast forward, reverse and/or pause the recorded content that is playing on the end-user device. Media units such as set-top boxes may comprise suitable logic, circuitry, code, and/or interfaces that may be operable to present viewers with many more options and perform many more functions and/or operations, some of which may affect how the connected end-user device operates. It should be understood that this disclosure contemplates various types of media units (for example, set-top boxes, gateways, computers, tuners, other digital video devices, etc.)—not just set-top boxes. Therefore, throughout this disclosure, whenever reference is made to a set-top box, it should be understood that other types of media units are contemplated as well.

A set-top box (for example, unit 275a) and a smart TV (end-user device), such as end-user device 270a, may also be configured and operable such that the smart TV may communicate commands to the set-top box. For example, a smart TV (with proper authentication, for example) may be operable to instruct a set-top box to change channels or video playback modes, perform guide functions and the like. Alternatively or in addition, a set-top box may comprise suitable logic, circuitry, code, and/or interfaces, and may utilize appropriate communication protocols to interact directly with a network (for example network 260). In this regard, a set-top box may send data via a network or may receive commands via a network. For example, a remote system, for example, an ACR system, may send commands via a network to a smart TV and, provided that the ACR system possesses proper authentication, may cause the smart TV to change channels, either directly on the TV itself or indirectly via an API exposing an interface between the TV and STB (e.g., IR function), or video playback modes, perform guide functions or other operations.

Figure 3:
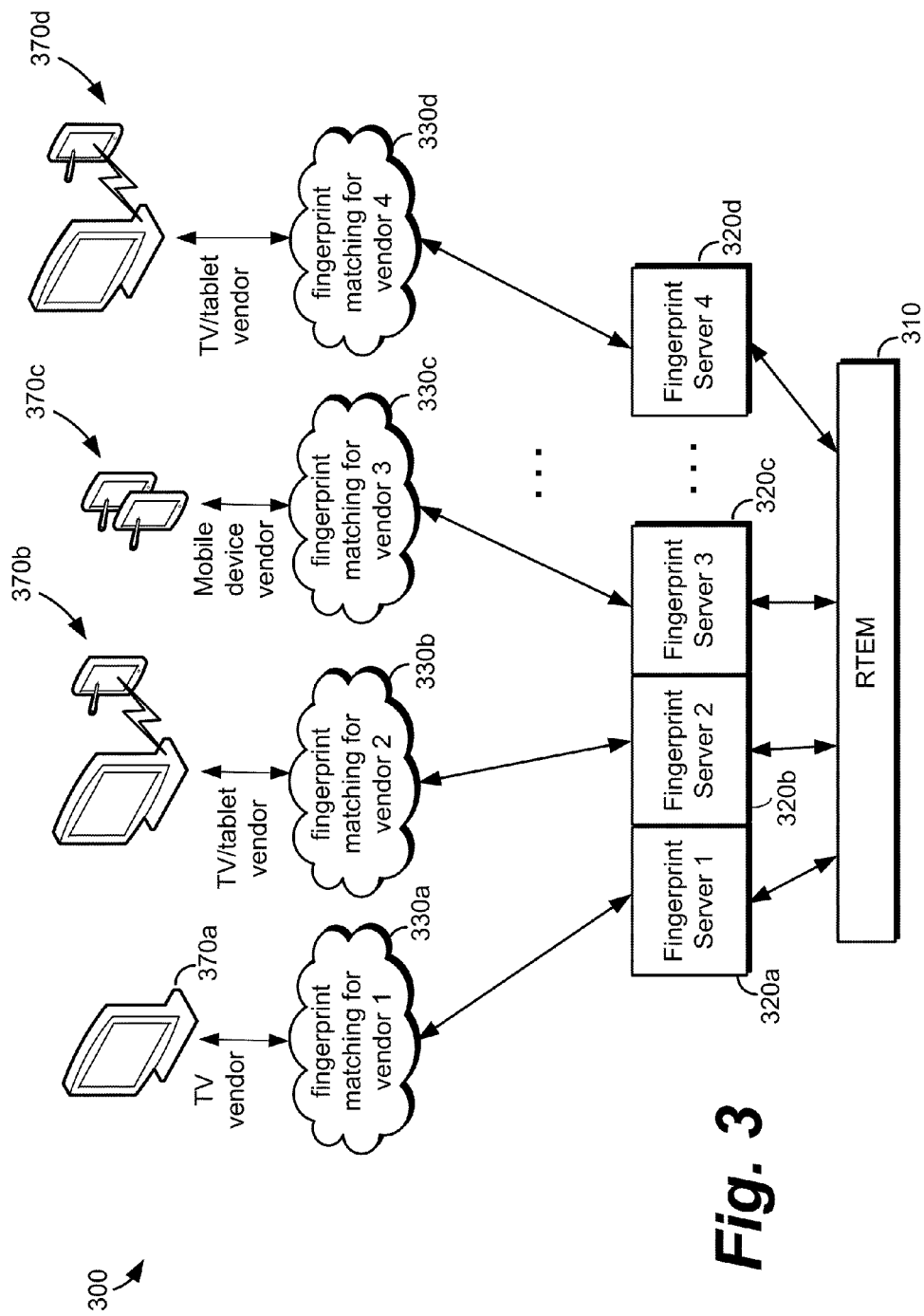
FIG. 3 is a high-level block diagram illustrating a portion of an exemplary system for detection of user-initiated events, in accordance with one or more embodiments of the present invention.

FIG. 3 is a high-level block diagram that illustrates a portion of an exemplary system for detection of user-initiated events, in accordance with one or more embodiments of the present invention. Referring to FIG. 3, there is shown a portion 300 of an exemplary system for detection of user-initiated events, which may comprise one or more end-user devices (devices 370a, ..., 370d), one or more fingerprint matching systems (systems 330a, ..., 330d), one or more fingerprint servers 320a, ..., 320d, and an real-time event manager 310. As shown in FIG. 3, each end-user device (devices 370a, ..., 370d) may support and/or utilize a different fingerprint technology, and therefore each end-user device may require its own fingerprint matching system (systems 330a, ..., 330d). Accordingly, an ACR system may be operable to include fingerprint servers capable of communicating with some or all of the different fingerprint matching systems supported by the system. FIG. 3, shows how fingerprint servers 320a, ..., 320d may be operable to communicate with distinct fingerprint matching systems 330a, ..., 330d. These features may be implemented by having a central video fingerprint repository and management platform that facilitates triggering interactive events across various platforms regardless of the ACR vendor solution (e.g., fingerprinting technology). Such a system may be scalable and additional ACR vendor solutions may be added. An real-time event manager 310 may be operable to assign one or more interactive event identifiers to the different sets of video fingerprints (for example utilizing different fingerprint technologies) generated by the fingerprint servers 320a, ..., 320d.

The End-user devices (for example, devices 330a, ..., 330d) may utilize the same video and/or audio fingerprinting technology utilized by the associated fingerprint servers and supported by the associated fingerprint matching system vendors. The fingerprint vendor may be a vendor, manufacturer, or other third-party service provider that may comprise suitable logic, circuitry, code, and/or interfaces operable to provide hosted services over the Internet for the viewer devices. These services may comprise video and/or audio fingerprint matching as well as the delivery of any interactive event IDs associated with a match. The end-user devices may comprise suitable logic, circuitry, code, and/or interfaces that may be operable to take and send fingerprints to the fingerprint vendor for matching.

Figure 4:
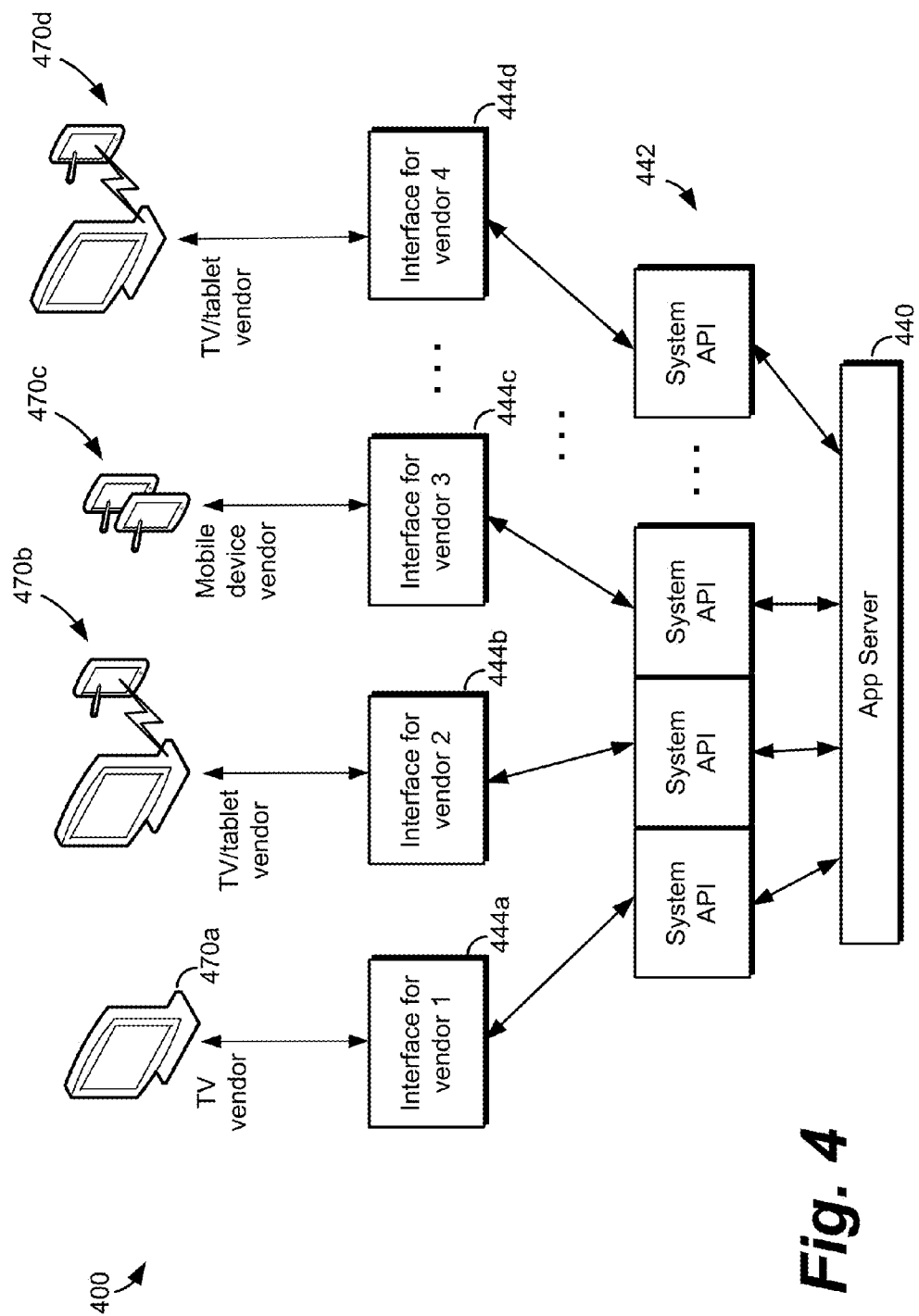
FIG. 4 is a high-level block diagram illustrating a portion of an exemplary system for detection of user-initiated events, in accordance with one or more embodiments of the present invention.

FIG. 4 is a high-level block diagram that illustrates a portion of an exemplary system for detection of user-initiated events, in accordance with one or more embodiments of the present invention. Referring to FIG. 4, there is shown a portion 400 of an exemplary system for detection of user-initiated events, which may comprise one or more end-user devices (devices 470a, . . . , 470d), one or more application servers 440, one or more system API's 442 (Application Programming Interface) and/or one or more vendor-specific interfaces 444a, . . . , 444d.

As shown in FIG. 4, a variety of end-user devices 470a, . . . , 470d may be operable to properly execute applications served by application server 440 by way of, for example, an API such as the system API 442 and/or vendor-specific interfaces 444a, . . . , 444d. A standardized API may be utilized to reduce the number of APIs being utilized. In one example, a vendor (for example, vendor 1) may acquire the system API 442 and then implement the system API 442 (along with additional vendor 1—specific interfacing) into the devices manufactured by the vendor. In this example, the system API 442 and the interface for vendor 1 444a may be implemented fully or substantially within devices manufactured by vendor 1. In another example, a vendor (for example, vendor 1) may provide a vendor-specific interface or API (such as interface 444a) to the operators and/or directors of application server 440 (or other parties that are responsible for creating applications and/or interactive events). In this example, operators, directors or other parties may implement an API for each vendor, in which case the vendor interface 444a and system API 442 may be implemented within the application server 440, or related system components utilized to create and store applications.

API's that allow interfacing with various systems and subsystems such as systems or modules from different vendors may be provided. For example, an API may enable an end-user device to perform real time downloading and invocation of applications from the application server 440. Additionally, API's and/or vendor interfaces may establish a single framework that can be leveraged for various applications. For example, the framework may include functions that facilitate user response data to multiple locations, for example, user response data could be sent to multiple distinct locations and/or servers, the address of which may be maintained by the system or network content provider. In another example, the framework may enable the invocation of overlay windows and applications, and may facilitate data communication between multiple applications and/or overlay windows, and between applications and an external entity, for example a third-party service. In another example, the framework may enable the communication of content, data and other information to and from second-screen devices.

End-user devices, for example, devices 470a, . . . , 470d, may comprise an ACR service that enables the device to perform one or more functions that may allow the end-user device to operate with or communicate with the ACR system and may allow the end-user device to execute one or more applications and/or interactive events. In some examples, the ACR service may be active and running directly on connected devices whenever the devices are operating or communicating with the system, and the ACR service may invoke an application framework, which may include system API's. The ACR service may be operable to "listen" for or detect actionable events (for example, interactive events) and then act upon these events according to rules, which may be defined in a corresponding interface definition. The ACR service may be operable to receive and/or collect user responses in response to an interactive event, for example, and communicate corresponding response data to an application, service or external entity such as a server, service, URL, or the like.

Figure 5:
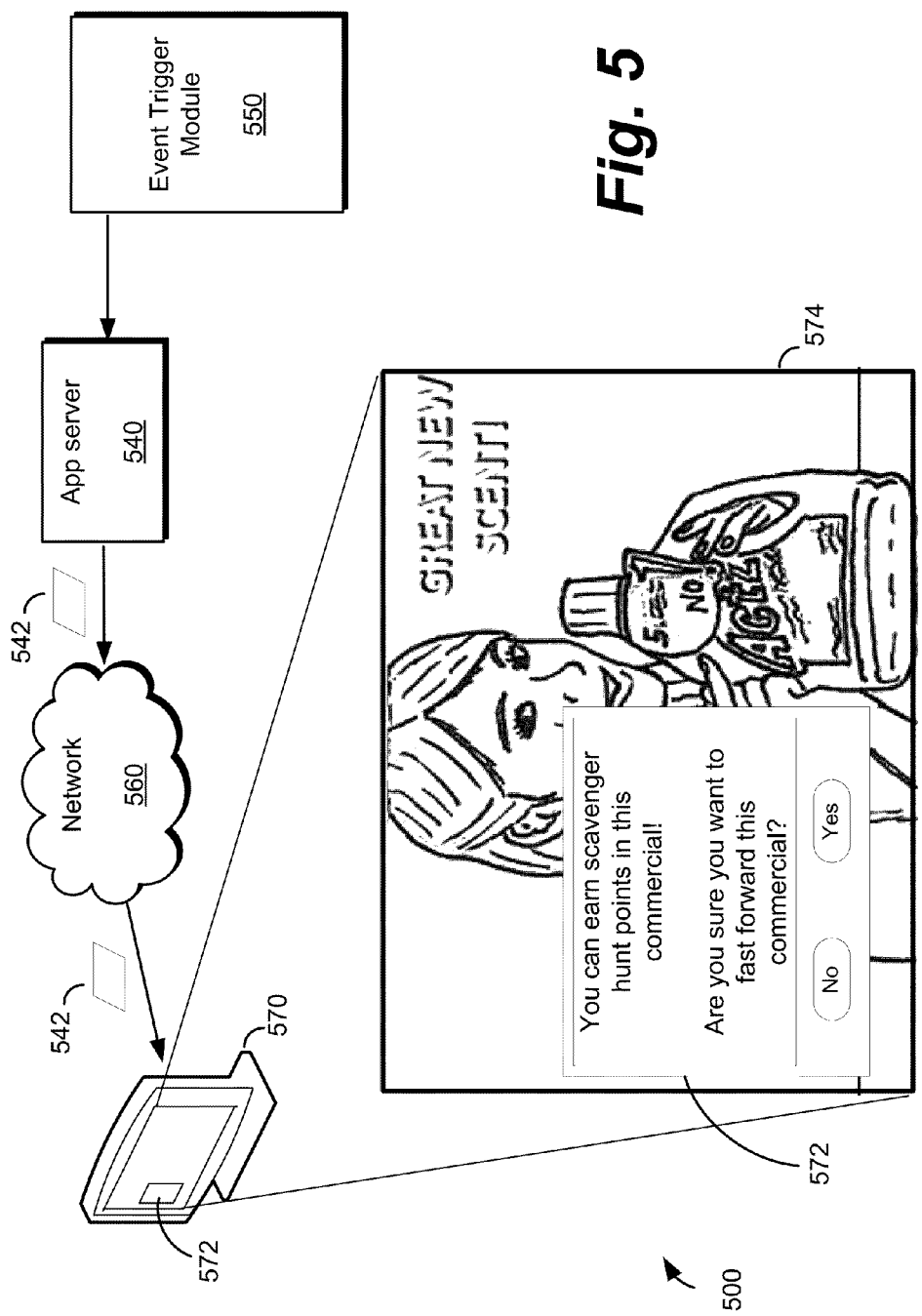
FIG. 5 is a high-level block diagram illustrating a portion of an exemplary system for detection of user-initiated events, in accordance with one or more embodiments of the present invention.

FIG. 5 is a high-level block diagram that shows a portion of an exemplary system for detection of user-initiated events, in accordance with one or more embodiments of the present invention. Referring to FIG. 5, there is shown a portion 500 of an exemplary system for detection of user-initiated events, which may comprise one or more end-user devices (for example, device 570), an interactive director 550, one or more application servers 540 and a network 560. FIG. 5 also illustrates the flow of information that may occur when an event trigger module 550 initiates an interactive event related to live or replayed programming and causes (in connection with an NTP server, a fingerprint server and a fingerprint matching system—not shown in FIG. 5) that event to be displayed on network-connected end-user devices.

In the example shown in FIG. 5, the event trigger module 550 may indicate to the application server 540, which applications and/or interactive events the application server 540 should push to network-connected end-user devices when certain content (and/or content playback situations/indications) appears on the screen of the end-user device 570. The event trigger module 550 may select appropriate applications and/or interactive events that are synchronized with time points in the live or replayed content being played on the end-user device 570. In this regard, the event trigger module may communicate interactive events that correspond to points in live or replayed content, such that the real-time event manager 110 may be operable to trigger interactive events, via a fingerprint server and fingerprint matching system, in the end-user device 570. When an interactive event is triggered in an end-user device, for example, device 570, the device may send a request for data via a network 560 to an application server 540. Note that the triggered events may have specific parameters defining their operation during trick modes (i.e., pause, fast-forward, rewind, slow, etc).

The application server(s) 540 may be operable to handle data sent from an end user device 570, as well as data sent from various components and modules within the event trigger module 550. When the application server 540 receives a signal and/or request, and an interactive event ID from an end-user device 570, the application server 540 may send application data 542 to one or more end-user devices 570 via a network 560. The application server 540 may send application data 542 to an end-user device 570 in response to receiving a signal (and an interactive event ID) from the device 570 for example. The application server 540 and/or the event trigger module 550, may also be operable to integrate with a variety of back-end systems, for example to integrate external application/event/content servers (not shown) into the system.

It should be understood that application data (for example, application data 542) relates to one or more interactive events and/or applications. Therefore, when a description herein refers to a module communicating an application or an interactive event, it should be understood that the application and/or the interactive event may actually be sent in the form of one or more data packets. One or more data packets related to an application and/or interactive event may generally be referred to as application data, for example application data 542. The application data 542 may comprise, but need not be limited to, text, banners, shapes, graphics, overlays, sidebars, applications, widgets, and/or video, for example. The application data 542 may also comprise computer code, applications or other interactive elements that when executed by an end-user device, may present content to a viewer and allow a viewer to interact with an interactive element. The application data 542 may be synchronized with content that is currently (or was recently) displayed on the end-user device. In one example, when the application data 542 is sent to an end-user device 570, the end-user device may display an overlay window 572 that takes up at least a portion of the full display 574.

In one example implementation of the techniques described herein, for example as shown in FIG. 5, a viewer may be watching a replay of a television show, using a DVR feature in a set-top box, for example, where the video of the television show is displaying on the screen of the end-user device 570. In this example, the television show that the viewer is watching may have previously been analyzed and archived by a component associated with (or included in) the event trigger module 550. The component may have determined when in the show an interactive event should take place, or what types of video playback situations should trigger a particular interactive event (e.g., trick mode options).

An ACR system, for example, one similar to the system 100 described in reference to FIG. 1, may be operable to detect when a user initiates an event related to video that plays on an end-user device. For example, an ACR system may be operable to detect when a user starts, stops, fast forwards, reverses and/or pauses a program that is playing on the end-user device. An ACR system may also be operable to detect when a user selects, or tunes to a channel, or changes channels. An ACR system may detect these and other user-initiated events by utilizing the ACR techniques described herein. In addition to being operable to detect when video displayed on an end-user device matches one or more reference video segments, an ACR system may also be operable to detect when video displayed on an end-user device is playing back in a different manner than one or more reference video segments. For example, the ACR system may detect that a video is being played back at different speed or in a different direction, for example. An ACR system may also be operable to detect when video displayed on an end-user device is playing back in a different manner than one or more reference video segments by detecting images (that display on the screen of an end-user device) related to content playback commands. For example, if a box and/or icons appear on the end-user device when a user chooses to fast forward a recorded program, an ACR system may detect the box and/or icons to determine that a viewer is attempting to fast forward a program. For example, the viewer may initiate a feature that is operable to fast forward through one or more commercials. In addition to or in conjunction with ACR techniques, an ACR system may detect user-initiated events by accepting and analyzing signals sent via the end-user device (and/or a related unit such as a set-top box) over a network.

Referring to the example illustrated in FIG. 5, a viewer may be watching a replay of a television show where the video of the television show is displaying on the screen of the end-user device 570. The event trigger module 550 (and/or associated components) may have determined what types of video playback situations should trigger a particular interactive event. For example, the event trigger module 550 may have determined that if during (or just before) the first commercial in a recorded program the user attempts to fast forward, an interactive event should be initiated. The screen 574 illustrates an exemplary video frame that is related to commercial that a viewer may encounter and attempt to fast forward past. In some embodiments of the invention, the ACR system may detect that the video displaying on the screen of the end-user device 570 is playing back at a greater speed than an archived reference video (which indicates that the viewer is attempting to fast forward). The ACR system (including a fingerprint server and a fingerprint matching system) may then initiate an interactive event (with an associated interactive event ID) to execute on the end-user device 570. The end-user device may then request the interactive event and/or the application that may be associated with the interactive event ID from the application server 540. The application server 540 may then send the appropriate application data 542 to the end-user device 570 via a network 560. The device may then display the interactive event/application.

FIG. 5 also shows an exemplary interactive event that may display on an end-user device in response to a viewer attempting to fast forward through a commercial. The interactive event, when executed by the end-user device, may display an overlay window 572 that is synchronized with the user-initiated event (for example, attempted fast forwarding). The interactive event may be designed, for example, to persuade or incentivize a viewer to continue to watch a commercial. The interactive event may inform the user of some reason why they may want to continue watching the commercial and then may solicit a viewer response and/or choice. In one example, the interactive event may solicit user response via a multiple choice question, although other types of responses are contemplated, such as text responses. Once a viewer sees the interactive element on the screen of an end-user device, the user may interact, for example by choosing one of the choices in a multiple choice question. The selection of a particular choice may be made utilizing a remote control and/or a second-screen device in communication with the end-user device, for example.

The interactive event (displayed via an overlay window 572, for example) may be designed, for example, to persuade or incentivize a viewer to continue to watch a commercial by informing the viewer of useful information or by allowing the viewer to interact with a contest, program, feature or the like. In one example, as shown in FIG. 5, a scavenger hunt contest may allow a viewer to collect points by viewing and identifying items that appear on the screen of an end-user device during a commercial. When the viewer attempts to fast forward a commercial, the ACR system may initiate an interactive event that displays an overlay window 572 informing the viewer that they can earn scavenger hunt points or other types of incentives for this commercial. The viewer may then have the option to continue fast forwarding or interact while fast forwarding, as this will be controlled by the STB while the ACR module may be resident on the smart TV itself, or to stop fast forwarding and watch the commercial. The playback of the program (including any fast forwarding) may be paused until the user selects and option. This may happen if the ACR enabled smart TV can communicate with the STB and the viewer has permitted this access. A scavenger hunt contest like the one contemplated by FIG. 5 may be associated with an online service that allows a user to collect points across multiple programs and optionally to compare the number of points earned with other members of the online service. The user's points and other information related to the scavenger hunt contest may be associated with a user account on a system that supports a plurality of user accounts. The end-user device may be adapted to communicate via a network with such an online service to store point totals and retrieve information about other members.

Other types of contests, programs, features or the like may be displayed to a viewer instead of, or in addition to, a scavenger hunt contest. For example, overlay window 572 may inform a viewer that the commercial contains information about valuable coupons, or optionally that the commercials include trailers for exciting new movies.

The end-user device, associated set-top box, and/or the ACR system may be adapted to allow viewers to set preferences related to interactive events and related to content that is displayed on the end-user devices. For example, a viewer may maintain a list of movies (or genres) that may be of interest to the viewer. User preferences may indicate that interactive events should only notify the viewer of movie trailers that are categorized accordingly. In another example, user preferences may indicate that no overlay windows associated with the fast forward feature should be displayed. In another example, user preferences may indicate that no overlay windows should be displayed at all. The end-user device, associated set-top box, and/or the ACR system may include a mode or setting whereby in one or more situations, user preferences may be overridden. If such a mode or setting is active, an overlay window may be presented on an end-user device even if a user setting indicates an opposite preference.

Figure 6:
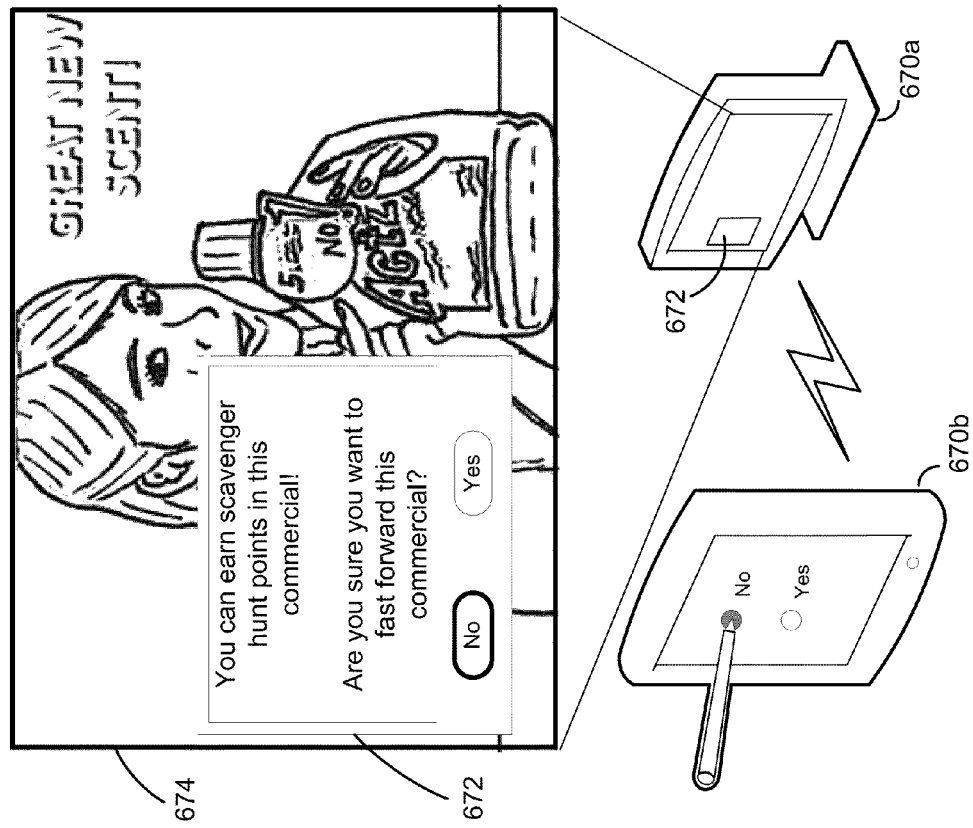
FIG. 6 is a high-level block diagram illustrating a portion of an exemplary system for detection of user-initiated events, in accordance with one or more embodiments of the present invention.

FIG. 6 is a high-level block diagram that shows a portion of an exemplary system for detection of user-initiated events, in accordance with one or more embodiments of the present invention. Referring to FIG. 6, there is shown a portion 600 of an exemplary system for detection of user-initiated events, which may comprise one or more end-user devices, for example devices 670*a* and 670*b*. FIG. 6 also illustrates the flow of information that may occur when a viewer responds to an interactive event that is displayed on the screen of an end-user device. Part or all of one or more responses sent by an end-user device in response to an interactive event may be referred to as user response data.

The example depicted in FIG. 6 includes a two-device (devices 670*a*, 670*b*) setup. In this example, once a viewer sees an overlay window 672 on the screen of their end-user device (device 670*a* and/or 670*b*), the viewer may interact with the related application or interactive element via a second-screen device 670*b*, such as a PDA, tablet or smart phone. In this example, the user may have an application installed on the second screen device 670*b* that enables the user to see displays, information and interactive choices that coincide with the overlay window 672 on the screen of the end-user device 670*a*. The viewer may then select a choice, or otherwise indicate a response by interacting with the second-screen device 670*b*, for example by pressing on the screen with a stylus or the viewer's finger, or by pressing buttons on the second-screen device.

As one example, depicted in FIG. 6, it can be seen that the screen of second-screen device 670*b* may display interactive choices that coincide with the choices displayed in overlay window 672. A viewer may then indicate a response using the second-screen device 670*b*, for example, by selecting a button labeled "No." In the example of FIG. 6, when the viewer selects "No" on the second-screen device, the same choice appears as selected in the overlay window 672. The second-screen device 670*b* may communicate the viewer's response to the end-user device 670*a* or directly to upstream application servers by a variety of connections such as a wired connection and/or a wireless connection (e.g., WIFI, Bluetooth, infrared, and the like). Other setups may include a single end-user device, for example device 670*a*. In these setups, a viewer may interact with the related application or interactive element via a remote control or other interface associated with the end-user device 670*a*.

Referring to FIG. 6 for example purposes, a viewer may indicate a response that he does not want to fast forward through a commercial (see the "No" option indicated on overlay window 672). For example, the viewer may be interested in participating in a scavenger hunt contest, and may choose to watch the commercials in order to look for items that display in the commercials to gain points. In this example, if the viewer selects "No," the commercials may resume playing back on the end-user device 670*a*. This may occur if the ACR enabled smart TV communicates directly with the STB/DVR. In most scenarios, this may not be the case. The viewer will explicitly have to stop fast forwarding if they wish to participate in the game.

Figure 7:
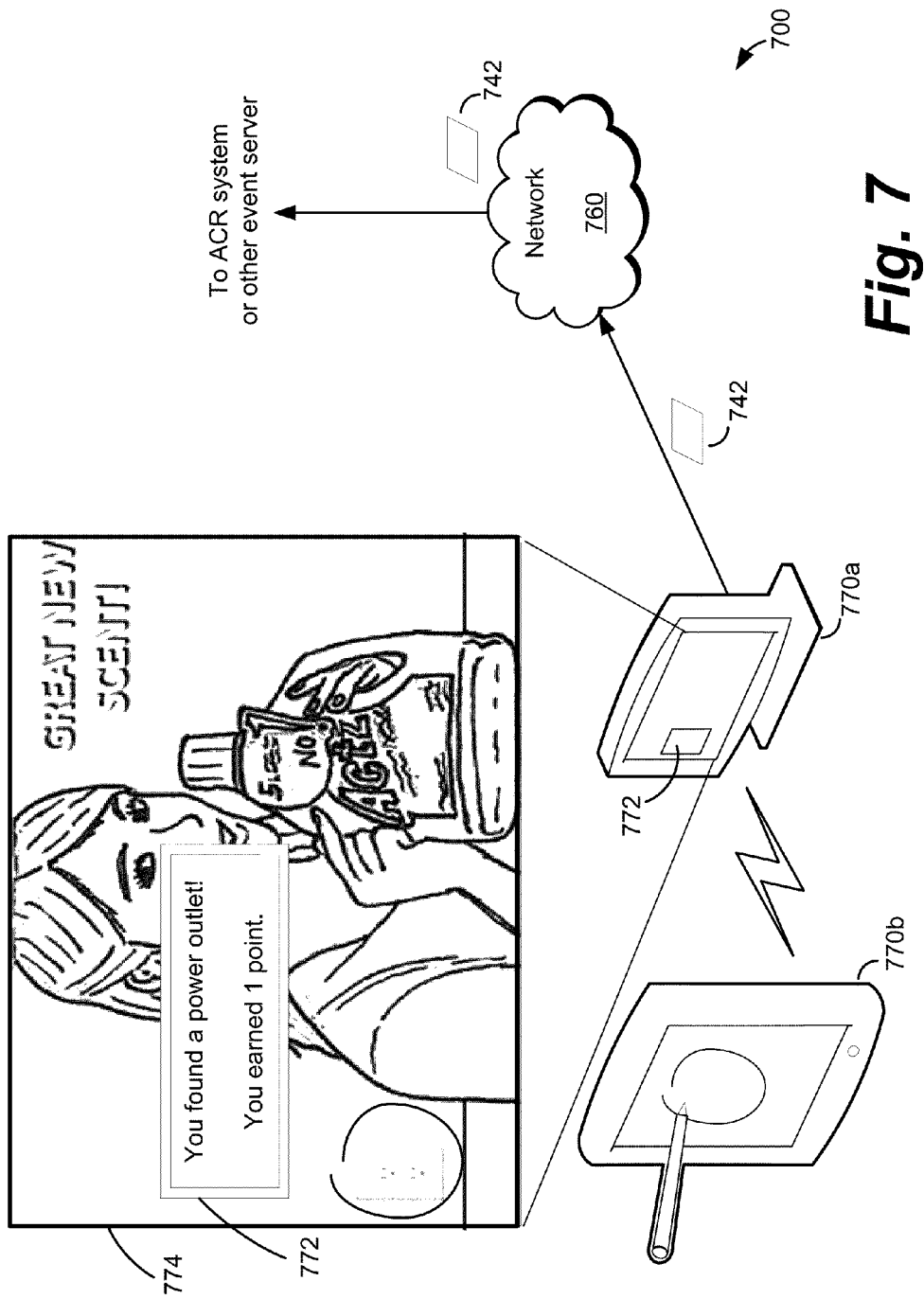
FIG. 7 is a high-level block diagram illustrating a portion of an exemplary system for detection of user-initiated events, in accordance with one or more embodiments of the present invention.

FIG. 7 is a high-level block diagram that shows a portion of an exemplary system for detection of user-initiated events, in accordance with one or more embodiments of the present invention. Referring to FIG. 7, there is shown a portion 700 of an exemplary system for detection of user-initiated events, which may comprise one or more end-user devices (for example devices 770*a* and 770*b*) and a network 760 in connection with an ACR system and/or other systems, servers and the like. FIG. 7 also illustrates the flow of information that may occur when a viewer responds to an interactive event that is displayed on the screen of an end-user device, for example to participate in a scavenger hunt contest. Part or all of one or more responses sent by an end-user device in response to an interactive event may be referred to as user response data.

In the example depicted in FIG. 7, a viewer may have selected "No" in response to an overlay window that may have been displayed or presented when the viewer attempted to fast forward a commercial. When the viewer selected the "No" option, which may have indicated that the viewer was not sure he wanted to fast forward, the commercials may have resumed playing back on the end-user device 770*a*, although in most cases the viewer will have to explicitly stop fast forwarding. In this example, the viewer may have decided to watch the commercials in order to participate in a scavenger hunt contest where a user, for example, notices and indicates items displayed on the end-user device. In the example depicted in FIG. 7, a user may have noticed an item, such as a power outlet, which may have appeared in the background of a commercial displayed on the screen 774 of an end-user device 770*a*. The user may indicate an item that was noticed using a hand-held device, for example, device 770*b*, or a remote control or other interface associated with end user device 770*a*. For example, the display of a hand-held device 770*b* may coincide with the content that is displayed on the screen or could permit drawing and/or highlighting of that content on the end-user device 770*a*. The hand-held device may be operable to allow a user to touch or circle noticed items using a finger or a pointer, stylus or the like. If a user discovers and indicates an item that qualifies for points in a scavenger hunt contest, an overlay window 772 may display on the screen informing the viewer that one or more points were earned.

If a viewer responds to an interactive event that requires data to be sent to a remote system, user response data 742 may be transmitted via a network 760 to such a remote system, for example an ACR system or other system, server or the like. The remote system, for example an ACR system, may be operable to receive and handle user response data. The user response data 742 may comprise, but need not be limited to, answers to multiple choice questions, text responses, contest point updates and the like. In one example, user response data 742 may be sent to the same application server (similar to application server 540 of see FIG. 5) that transmitted the application data and/or interactive event to the end-user device 770a. However, in some embodiments of the invention, the end-user device may be operable to transmit response data to other servers and devices in addition to or instead of an application server.

The exemplary implementation of the techniques described herein as shown and described in relation to FIGS. 5-7 is only one example. The ACR techniques described herein may be applied to other situations, and may be utilized to initiate other interactive events.

In one situation, a viewer may be watching a television show (either live or replayed) where the video of the television show is displaying on the screen of an end-user device. Referring to FIG. 5 for explanation purposes only, the event trigger module 550 may have determined that if a show is paused (utilizing DVR features, for example incorporated into a set-top box), an interactive event should be initiated. For example, the ACR system may detect that the video that is displayed or presented on the screen of the end-user device 570 is playing back at a slower speed (or paused completely) than an archived reference video (which indicates that the viewer has paused the show). The ACR system, the fingerprint matching system and associated components, may then initiate an interactive event (with an associated interactive event ID) to execute on the end-user device 570. The invocation of the event may be performed locally on the device as the detection of the trick mode (i.e., pause, fast forward, rewind) will in most cases be performed there as well. The end-user device may then request the interactive event and/or application associated with the interactive event ID from the application server 540. The application server 540 may then send the appropriate application data 542 to the end-user device 570 via a network 560. The device may then display the interactive event/application.

The interactive event, when executed by the end-user device, may display an overlay window 572 that may be synchronized with the user-initiated event, for example, a pause a show. The overlay window may take up a portion of the screen or the whole screen 574. The interactive event may be designed to entertain a viewer while the show is paused. For example, the interactive event may be a game, quiz, or other type of entertainment. The interactive event and end-user device(s) may be adapted to accept user response data from a viewer and optionally communicate user response data to a remote system.

In another example, while a show is paused, the ACR system may initiate a commercial and/or advertisement to display on the screen of the end-user device 570. Such commercials and/or advertisements may or may not be interactive. In some embodiments of the invention, the ACR system maintains an archive of time-relevant commercials that may be pushed to end-user devices at certain times or during certain playback situations during a program. In some situations, commercials may be relevant and valuable to a network for a limited amount of time, for example, 7 days. In some situations, a television network or other content provider may only get credit and/or money for commercials that are played to consumers within a certain number of days. In this regard, it may be beneficial for a content provider to utilize an ACR system and a database to maintain a set of time relevant commercials. An ACR system may detect when end-user devices are paused, for example, and may push relevant commercials to end-user devices. In other examples, an ACR system may detect when a user may be watching an older recorded program, for example, when the commercials begin to play, and the ACR system may push time relevant commercials to replace stale or less valuable commercials.

In another situation, the ACR techniques described herein may be applied to implement parental controls. For example, a child may be watching a television show, either live or replayed, where the video of the television show is displaying on the screen of an end-user device. Referring to FIG. 5, the event trigger module 550 may have determined that if a viewer attempts to tune to a specific unauthorized channel or program, an interactive event should be initiated. For example, a viewer may initiate a feature that is operable to tune to channels, and the content recognition system may be operable to detect the channel that the viewer is attempting to tune to. Unauthorized channels or programs may be, for example, pornographic channels, violent channels and other channels that are not appropriate for children or may have been blocked for some other reason. For example, the ACR system may detect that the video of the new channel or program displaying on the screen of the end-user device 570 matches archived reference video that has been flagged as an unauthorized channel or program or it may use a variant of logo and/or guide detection to determine the channel number and compare against a list of prohibited channels for a given service provider. Alternative or in addition, the ACR system may detect other features displayed on the screen to detect an unauthorized channel or program, such as a channel and/or program information bar along the bottom of the screen. Alternative or in addition, a set-top box may transmit information to the ACR to system to indicate the channel/program as being unauthorized. The ACR system and optionally a fingerprint matching system, may then initiate an interactive event, with an associated interactive event ID, to execute on the end-user device 570. The end-user device may then request the interactive event and/or application associated with the interactive event ID from the application server 540. The application server 540 may then send the appropriate application data 542 to the end-user device 570 via a network 560. The device may then display the interactive event and/or application.

The interactive event, when executed by the end-user device, may display an overlay window 572 that is synchronized with the user-initiated event (for example, tuning to an unauthorized channel/program). The overlay window may be overlaid or displayed on at least a portion of the screen 574. The interactive event may be designed to block the video and/or audio of the unauthorized program and/or prevent the viewer from tuning to the unauthorized channel. For example, the interactive event may display an overlay window 572 that informs the viewer that they are attempting to access an unauthorized channel and/or program and may optionally provide the viewer with alternative options. For example, if the overlay window may provide the viewer with an option to tune to a cartoon channel instead. In some embodiments of the invention, the interactive event may cause the end-user device and/or set-top box to tune to an alternative channel automatically. Alternatively, or in conjunction with presenting a viewer with alternative channel options, an interactive event may display advertisements, for example advertisements targeting children. In one example, the interactive event may be operable to display advertisements that take up the majority (or all) of the screen such that the content of the unauthorized channel/program cannot be seen by the viewer.

Figure 8:
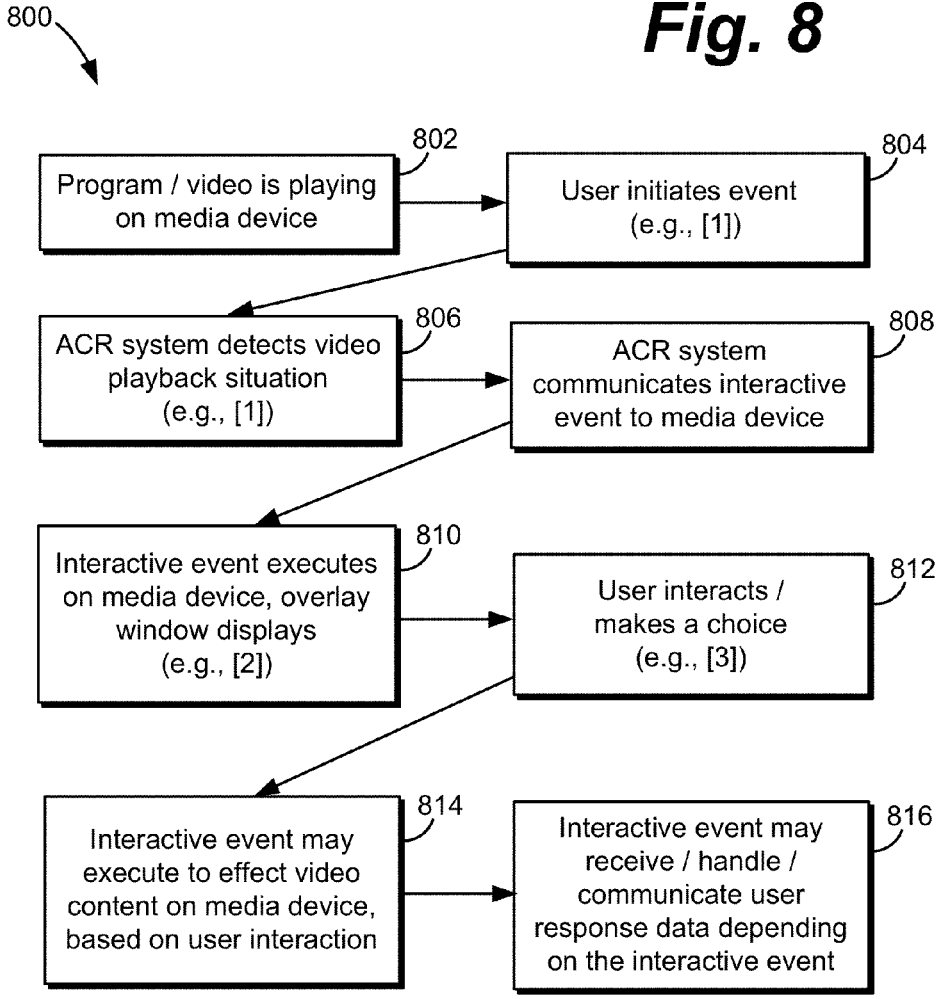
FIG. 8 is a flow diagram illustrating exemplary steps in the operation of an exemplary system for detection of user-initiated events, in accordance with one or more embodiments of the present invention.

FIG. 8 is a flow diagram 800 that illustrates exemplary steps in the operation of an exemplary system for detection of user-initiated events, in accordance with one or more embodiments of the present invention. At step 802, a program and/or video is playing on a media device that is in communication with an ACR system. At step 804, a user interacts with the media device and/or caused initiation of an event. For example, the user may start to fast forward through a commercial, pause the program or attempt to tune to an unauthorized channel and/or program. At step 806, the ACR system may detect a video playback situation. For example, the ACR system may detect that the user started to fast forward through a commercial, paused the program or attempted to tune to an unauthorized channel and/or program. At step 808, the ACR system may communicate an interactive event to the media device in response to the video playback situation. At step 810, the media device may execute the interactive event, and the interactive event may cause an overlay window to be presented or displayed on the media device. For example, the overlay window may present an incentive for the user to watch a commercial, or it may present a game that the user can play while the program is paused, or it may present alternative channels that the user can tune to instead of an unauthorized channel.

At step 812, the user may interact with the interactive event and/or may make a choice related to the interactive event and/or video playback. For example, a user may choose whether to watch the commercial or resume fast forwarding, or a user may play a game that displayed while a program was paused, or a user may choose to tune to an alternate channel instead of an unauthorized channel. At step 814, the interactive event may execute to affect video content on the media device, based on the user interaction. For example, a commercial may be played that offers a viewer chances to earn points in a scavenger hunt game, or a game may be presented until a user chooses to resume video playback, or the media device may tune to an alternate channel chosen by the user. At step 816, in some situations, the interactive event may receive and/or handle user response data, and in some situations, the media device may communicate user response data to a remote system and/or server. For example, if a user chooses to watch commercials to earn points in a scavenger hunt game, the media device may communicate user account information and game information to a remote system.

Figure 9:
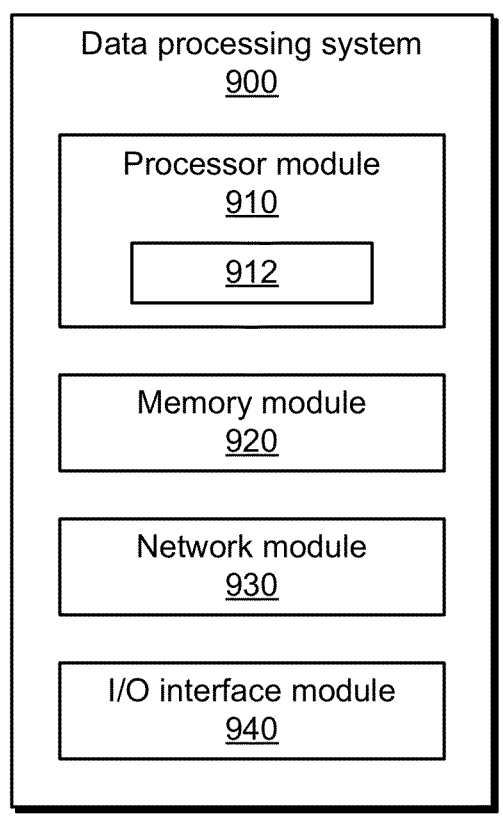
FIG. 9 is a block diagram illustrating an exemplary data processing system that may be used in accordance with one or more embodiments of the present invention.

FIG. 9 is a block diagram that shows an exemplary data processing system that may be used in accordance with one or more embodiments of the present invention. Additionally, the systems, methods and/or techniques described herein may utilize more than one data processing system. For example, referring to FIG. 1, the fingerprint servers 120 may be realized in one or more data processing systems. The real-time event manager 110 may be realized in one or more data processing systems. The event trigger module 150 may be realized in one or more data processing systems. The application server 140 may be realized in one or more data processing systems. The fingerprint matching systems 130 may be realized in one or more data processing systems. The end-user devices may include one or more data processing systems. Additionally, one or more of the components of system 100 shown in FIG. 1 may be realized within a single data processing system. One of skill in the art will realize that different combinations of data processing systems that realize components of system 100 may be provided without departing from the spirit and scope of the invention.

Referring to FIG. 9, there is shown a data processing system 900 that may correspond to one or more components of an exemplary system for detection of user-initiated events. The data processing system 900 may comprise a processor module 910, a memory module 920, a network module 930, and an input/output (I/O) interface module 940.

The processor module 910 may comprise suitable logic, circuitry, code, and/or interfaces that may be operable to perform the operations, functions, processes, techniques, and the like, for example one or more of the operations, functions, processes and techniques described herein. In this regard, the processor module 910 may be operable to enable one or more components of a system for detection of user-initiated events. The processor module 910 may comprise at least one processing device 912. The processing device 912 may be a central processing unit (CPU), a digital signal processor (DSP), and/or other type of integrated circuit that may be utilized to perform data processing operations.

The memory module 920 may comprise suitable logic, circuitry, code, and/or interfaces that may be operable to store information utilized to enable an example dial testing and audience response system. The network module 930 may comprise suitable logic, circuitry, code, and/or interfaces that may be operable to allow the data processing system 900 to communicate with one or more other data processing systems. This may comprise, for example other data processing systems within the same system for detection of user-initiated events, or other data processing systems external to the same system for detection of user-initiated events. The network module 930 may be operable to support one or more communication protocols such as wireline protocols and/or wireless protocols. The I/O interface module 940 may comprise suitable logic, circuitry, code, and/or interfaces that may be operable to interact with one of more devices or other sources of interactive information such as interfaces or peripherals that allow interaction by a director and/or administrator, or a device that allows a computer code to be loaded into the memory module 920 of the data processing system.

Figure 10:
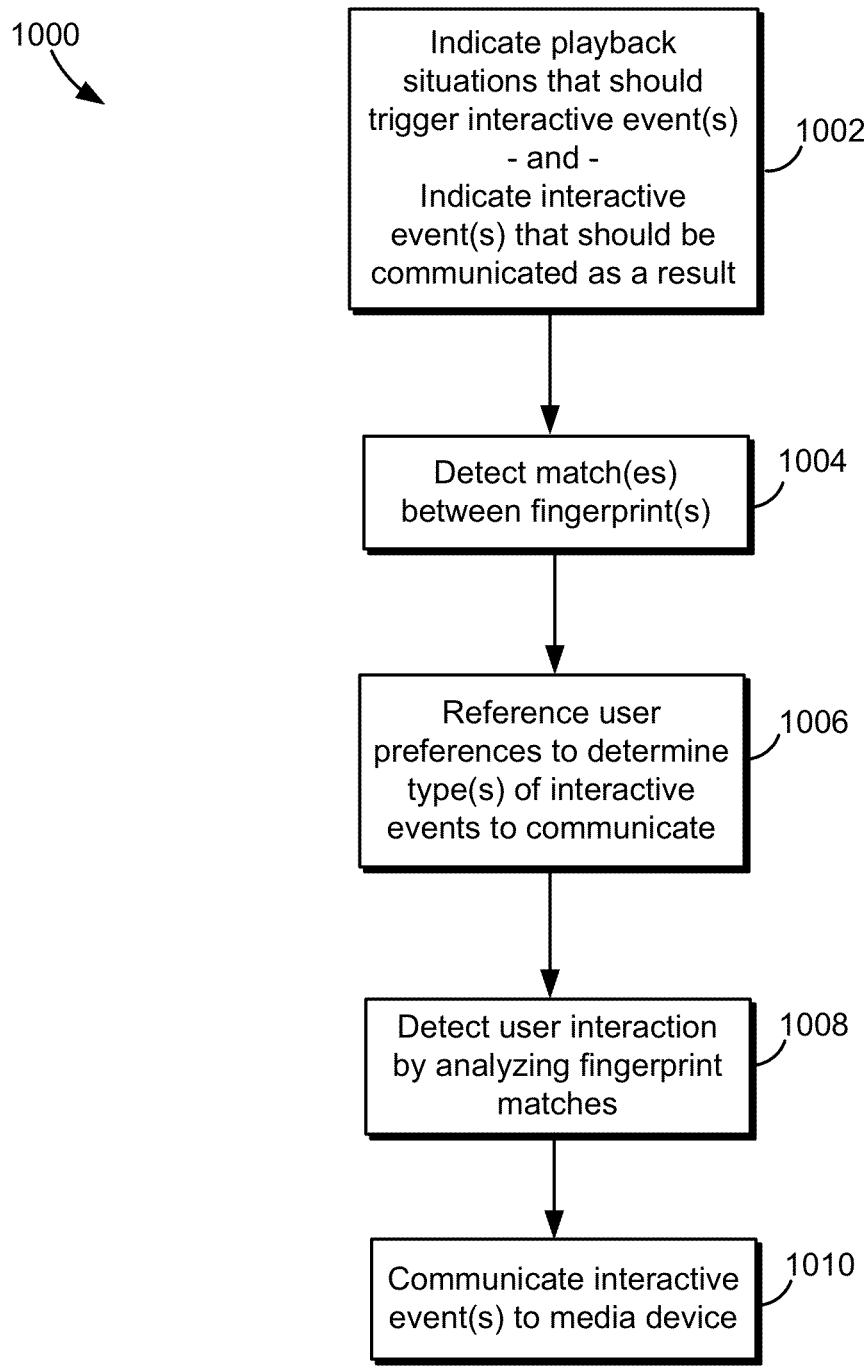
FIG. 10 is a flow diagram illustrating exemplary steps in the operation of an exemplary content recognition system, in accordance with one or more embodiments of the present invention.

In various embodiments of the invention, and referring to FIG. 10, a method 1000 may be executed in a content recognition system comprising one or more servers that are operable to communicate with one or more media devices. At step 1004, the content recognition system may enable detecting one or more matches between one or more video fingerprints corresponding to video content playing a media device and one or more video fingerprints corresponding to video content in the content recognition system. At step 1008, the content recognition system may enable detecting user interaction with the media device by analyzing the one or more fingerprint matches. The user interaction may initiate a feature that affects video content that plays on the media device. At step 1010, the one or more servers may communicate one or more interactive events to the media device. The one or more interactive events may be operable to execute on the media device and may be operable to control video content that plays on the media device. The one or more interactive events may be synchronized to the user interaction with the media device.

In some embodiments of the invention, as shown at step 1002 as a preliminary step, an event trigger module in the content recognition system may indicate to the one or more servers one or more types of video playback situations related to video content that should trigger an interactive event. The event trigger module may also indicate one or more interactive events that may be communicated to the media device as a result of a video playback situation being detected. The types of video playback situations may comprise one or more of the following: when the video content starts, stops, pauses, fast forwards, reverses and changes playback speed, etc. In one example, the one or more interactive events may be operable to present an incentive to watch a commercial if a viewer initiates a feature that is operable to fast forward the video content. As another example, the one or more interactive events may be adapted to entertain a viewer or present advertisements while the video content is paused. In some embodiments, the content recognition system is operable to implement parental controls, and the content recognition system may detect the initiation of a feature that is operable to tune to an unauthorized channel or program. In these embodiments, the one or more interactive events may be adapted to block the media device from displaying an unauthorized program, and may tune to an alternative channel.

In some embodiments of the invention, as shown at step 1006 as an intermediary step, the content recognition system may be operable to maintain and/or reference user preferences related to interactive events, and the content recognition system may reference user preferences to determine types of interactive events that the content recognition system should communicate to the media device.

Figure 11:
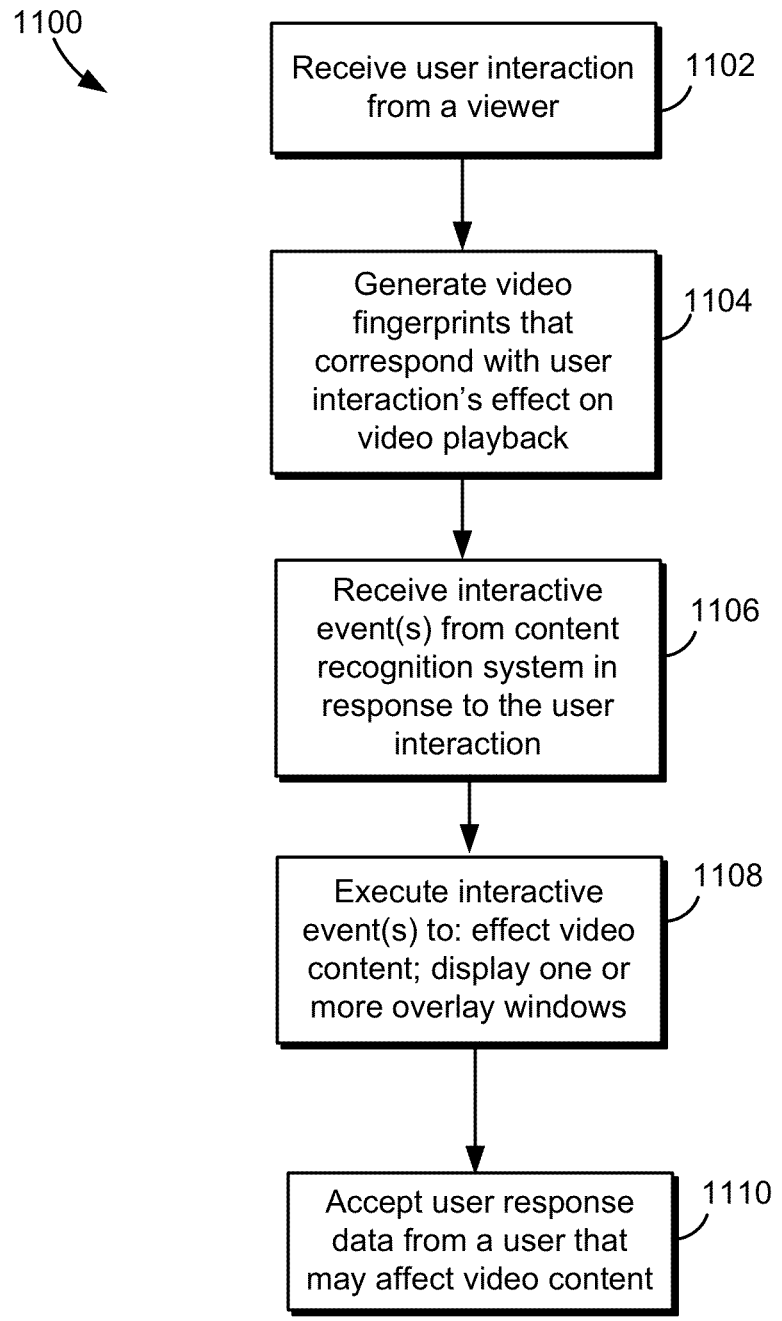
FIG. 11 is a flow diagram illustrating exemplary steps in the operation of an exemplary media device, in accordance with one or more embodiments of the present invention.

In various embodiments of the invention, and referring to FIG. 11, a method 1100 may be executed in a media device that is operable to play video content. At step 1102, the media device may receive user interaction from a viewer, wherein the user interaction initiates a feature that affects video content that plays on the media device. In one example, the user interaction may comprise initiating a feature that is operable to fast forward through one or more commercials, and the one or more interactive events, when executed, may present an incentive to watch the one or more commercials and may display an option whether to continue fast forwarding. In another example, the user interaction may comprise initiating a feature that is operable to pause a program, and the one or more interactive events, when executed, may present entertainment or advertisements while the video content is paused. In another example, the user interaction may comprise initiating a feature that is operable to tune to an unauthorized channel or program, and the one or more interactive events, when executed, may block the media device from displaying an unauthorized program and tune to an alternative channel.

At step 1104, the media device may generate one or more video fingerprints that correspond with video content that is playing on the media device, as the video content is affected by the user interaction. At step 1106, the media device may receive one or more interactive events from a content recognition system in response to the user interaction. At step 1108, the media device may execute the one or more interactive events to affect video content that is playing on the media device and the media device may display one or more overlay windows. The displaying may occur at time that is synchronized to the video content playing on the media device. At step 1110, the media device may accept user response data from a user, wherein the user response data affects video content that plays on the media device. For example, a user may indicate that they do not want to fast forward through a commercial, in which case the video content may resume playing back on the media device.

In various embodiments of the invention, a method may be executed in a media device 570 that is operable to play video content. The method may comprise receiving user interaction 1102 with the media device, wherein the user interaction causes the initiation of a feature that affects video content that plays on the media device 570. The method may comprise receiving 1106 one or more interactive events 542 from a content recognition system 100 in response to the user interaction. The method may comprise executing 1108 the one or more interactive events to affect video content that is playing on the media device 570, and display one or more overlay windows 572. The method may comprise communicating to the content recognition system 100 one or more video fingerprints that correspond to video content that has been affected by the user interaction. The content recognition system 100 may communicate 1010 the one or more interactive events 542 to the media device 570 in response to detecting a match 1008 with the one or more video fingerprints. The one or more interactive events 542 may be executed at a time that is synchronized to the user interaction with the media device.

In an exemplary embodiment of the invention, the video content as affected by the user interaction may determine the one or more interactive events 542 that are communicated 1010 from the content recognition system 100. For example, the user interaction may cause the initiation of a feature that is operable to fast forward through one or more commercials, and the one or more interactive events 542, when executed, may display an incentive 572 to watch the one or more commercials and may display an option 572 whether to continue fast forwarding. The incentive 572 to watch the one or more commercials may be an overlay window 572 that informs viewers of a scavenger hunt game, and the scavenger hunt game may be operable to allow viewers to earn points by indicating items in the one or more commercials. In another example, the user interaction may cause the initiation of a feature that is operable to pause a program, and the one or more interactive events 542, when executed, may display entertainment or advertisements while the video content is paused. In another example, the user interaction may cause the initiation of a feature that is operable to tune to an unauthorized or blocked channel or program, and the one or more interactive events 542, when executed, may block the media device from displaying an unauthorized program and may tune to an alternative channel.

In an exemplary embodiment of the invention, the method may comprise executing 1108 the one or more interactive events to accept 1110 user response data from a user, wherein the user response data affects video content that plays on the media device 570. In another exemplary embodiment, user preferences may determine the type of the one or more interactive events that are communicated from the content recognition system.

Another embodiment of the present disclosure may provide a non-transitory machine and/or computer readable storage and/or media, having stored thereon, a machine code and/or a computer program having at least one code section executable by a machine, computer and/or data processing system, thereby causing the machine, computer and/or data processing system to perform the steps as described herein for detection of user-initiated events utilizing automatic content recognition.

Accordingly, the present disclosure may be realized in hardware, software, or a combination of hardware and software. The present disclosure may be realized in a centralized fashion in at least one machine, computer and/or data processing system; or in a distributed fashion where different elements are spread across several interconnected machines, computers and/or data processing systems. Any kind of machine, computer and/or data processing system or other apparatus adapted for carrying out the methods described herein is suited. A typical combination of hardware and software may be a general-purpose computer system with a computer program that, when being loaded and executed, controls the computer system such that it carries out the methods and techniques described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present disclosure. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
   in a media device that is operable to play video content, wherein:
      the media device comprises an automatic content recognition (ACR) module that communicates with an ACR system that is external to the media device, and the ACR system supports different video fingerprint technologies from multiple vendors, wherein:
         the ACR system assigns same interactive event identifiers to different sets of video and audio fingerprints that are generated from the same video and audio content by the different video and audio fingerprint technologies from the multiple vendors based on timing of the assignment of the interactive event identifiers; and
         the interactive event identifiers are utilized by the media device to trigger one or more interactive events;
      the ACR module providing fingerprints to a fingerprint matching system in the ACR system for matching by the fingerprint matching system;
      the ACR module receiving information and/or content from the ACR system based on the matching by the fingerprint matching system; and
      the media device:
         detecting by the ACR module, user interaction with the media device, wherein the user interaction causes the initiation of a feature that affects video content that plays on the media device;
         receiving by the ACR module, the one or more interactive events from the fingerprint matching system in the ACR system in response to the user interaction; and
         executing the one or more interactive events to:
            affect video content that is playing on the media device;
            display one or more overlay windows corresponding to the affected video content; and
            allow interaction via the displayed one or more overlay windows.

2. The method according to claim 1, comprising communicating to the fingerprint matching system in the ACR system one or more video fingerprints that correspond to video content that has been affected by the user interaction, wherein the fingerprint matching system in the ACR system communicates the one or more interactive events to the media device in response to detecting a match with the one or more video fingerprints.

3. The method according to claim 1, wherein:
   the ACR system comprises an event trigger module that provides an indication of the one or more interactive events to be communicated to the media device; and
   the one or more interactive events are executed at a time that is synchronized to the user interaction with the media device.

4. The method according to claim 1, wherein the video content as affected by the user interaction determines the one or more interactive events that are communicated from the ACR system.

5. The method according to claim 4, wherein:
   the user interaction causes the initiation of a feature that is operable to fast forward through one or more commercials; and
   the one or more interactive events, when executed, display an incentive to watch the one or more commercials and display an option whether to continue fast forwarding.

6. The method according to claim 5, wherein:
   the incentive to watch the one or more commercials is an overlay window that informs viewers of a scavenger hunt game; and
   the scavenger hunt game is operable to allow viewers to earn points by indicating items in the one or more commercials.

7. The method according to claim 4, wherein:
   the user interaction causes the initiation of a feature that is operable to pause a program; and
   the one or more interactive events, when executed, display entertainment or advertisements while the video content is paused.

8. The method according to claim 4, wherein:
   the user interaction causes the initiation of a feature that is operable to tune to an unauthorized or blocked channel or program; and
   the one or more interactive events, when executed, block the media device from displaying an unauthorized program and tune to an alternative channel.

9. The method according to claim 1, wherein:
   executing the one or more interactive events comprises accepting user response data from a user; and
   the user response data affects video content that plays on the media device.

10. The method according to claim 1, wherein user preferences determine the type of the one or more interactive events that are communicated from the ACR system.

11. An system, comprising:
    a media device that is operable to play video content, wherein the media device comprises an automatic content recognition (ACR) module that communicates with an ACR system that is external to the media device, and the ACR system supports different video fingerprint technologies from multiple vendors, wherein:
       the ACR system assigns same interactive event identifiers to different sets of video and audio fingerprints that are generated from the same video and audio content by the different video and audio fingerprint technologies from the multiple vendors based on timing of the assignment of the interactive event identifiers; and
       the interactive event identifiers are utilized by the media device to trigger one or more interactive events;
    the ACR module providing fingerprints to a fingerprint matching system in the ACR system for matching by the fingerprint matching system; and the ACR module receiving information and/or content from the ACR system based on the matching by the fingerprint matching system; and the media device being operable to:
- detect by the ACR module, user interaction with the media device, wherein the user interaction initiates a feature that affects video content that plays on the media device;
- receive by the ACR module, the one or more interactive events from the fingerprint matching system in the ACR system in response to the user interaction; and
- execute the one or more interactive events to:
  - affect video content that is playing on the media device;
  - display one or more overlay windows corresponding to the affected video content; and
  - allow interaction via the displayed one or more overlay windows.

12. The system according to claim 11, wherein the media device is operable to communicate to the fingerprint matching system in the ACR system one or more video fingerprints that correspond to video content that has been affected by the user interaction, wherein the fingerprint matching system in the ACR system communicates the one or more interactive events to the media device in response to detecting a match with the one or more video fingerprints.

13. The system according to claim 11, wherein:
the ACR system comprises an event trigger module that provides an indication of the one or more interactive events to be communicated to the media device; and
the media device is operable to execute the one or more interactive events at a time that is synchronized to the user interaction with the media device.

14. The system according to claim 11, wherein the video content as affected by the user interaction determines the one or more interactive events that are communicated from the ACR system.

15. The method according to claim 14, wherein:
the feature that affects video content that plays on the media device is operable to fast forward through one or more commercials; and
the media device is operable to execute the one or more interactive events to display an incentive to watch the one or more commercials and display an option whether to continue fast forwarding.

16. The method according to claim 15, wherein:
the incentive to watch the one or more commercials is an overlay window that informs viewers of a scavenger hunt game; and
the scavenger hunt game is operable to allow viewers to earn points by indicating items in the one or more commercials.

17. The method according to claim 14, wherein:
the feature that affects video content that plays on the media device is operable to pause a program; and
the media device is operable to execute the one or more interactive events to display entertainment or advertisements while the video content is paused.

18. The method according to claim 14, wherein:
the feature that affects video content that plays on the media device is operable to tune to an unauthorized or blocked channel or program, and
the media device is operable to execute the one or more interactive events to block the media device from displaying an unauthorized program and tune to an alternative channel.

19. The method according to claim 11, wherein:
the media device is operable to execute the one or more interactive events to accept user response data from a user; and
the user response data affects video content that plays on the media device.

20. The method according to claim 11, wherein user preferences determine the type of the one or more interactive events that are communicated from the ACR system.

21. A system, comprising:
a media device;
an automatic content recognition (ACR) module within the media device;
an ACR system comprising an event trigger module; and
a fingerprint matching system in the ACR system, wherein:
the ACR System supports different video fingerprint technologies from multiple vendors;
the ACR system assigns same interactive event identifiers to different sets of video and audio fingerprints that are generated from the same video and audio content by the different video and audio fingerprint technologies from the multiple vendors based on timing of the assignment of the interactive event identifiers;
the interactive event identifiers are utilized by the media device to trigger one or more interactive events; and
the ACR module being operable to:
communicate fingerprints to the fingerprint matching system in the ACR system, wherein the fingerprint matching system matches the communicated fingerprints; and
receive information and/or content from the ACR system based on the matching that is done by the fingerprint matching system;
the media device being operable to:
detect user interaction with the media device that causes the initiation of a feature that affects video content that plays on the media device;
receive the one or more interactive events from the fingerprint matching system in the ACR system in response to the user interaction, wherein the event trigger module provides an indication of the one or more interactive events that are to be communicated to the media device; and
execute the one or more interactive events to:
affect video content that is playing on the media device;
cause display one or more overlay windows corresponding to the affected video content; and
allow interaction on the media device via the displayed one or more overlay windows.

* * * * *